United States Patent
Ben Henda et al.

(10) Patent No.: US 11,388,592 B2
(45) Date of Patent: *Jul. 12, 2022

(54) SECURITY CONTEXT HANDLING IN 5G DURING HANDOVER

(71) Applicant: Telefonaktiebolaget LM Ericsson (publ), Stockholm (SE)

(72) Inventors: Noamen Ben Henda, Stockholm (SE); Christine Jost, Lund (SE); Karl Norrman, Stockholm (SE); Monica Wifvesson, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/714,494

(22) Filed: Dec. 13, 2019

(65) Prior Publication Data
US 2020/0120501 A1 Apr. 16, 2020

Related U.S. Application Data

(63) Continuation of application No. 16/235,632, filed on Dec. 28, 2018, now Pat. No. 10,542,428, which is a
(Continued)

(51) Int. Cl.
*H04L 9/00* (2006.01)
*H04W 12/0433* (2021.01)
(Continued)

(52) U.S. Cl.
CPC ....... *H04W 12/0433* (2021.01); *H04L 63/062* (2013.01); *H04W 12/041* (2021.01);
(Continued)

(58) Field of Classification Search
CPC ........... H04W 12/0433; H04W 12/041; H04W 36/0038; H04L 63/062
(Continued)

(56) References Cited

U.S. PATENT DOCUMENTS

| 7,978,677 B2 | 7/2011 | Prakash et al. |
| 8,300,827 B2 | 10/2012 | Yang et al. |

(Continued)

FOREIGN PATENT DOCUMENTS

| CN | 101355507 A | 1/2009 |
| CN | 101378591 A | 3/2009 |

(Continued)

OTHER PUBLICATIONS

3rd Generation Partnership Project, "3rd Generation Partnership Project; Technical Specification Group Services and System Aspects; 3GPP System Architecture Evolution (SAE); Security architecture (Release 14)", Technical Specification, 3GPP TS 33.401 V14.1.0, Dec. 1, 2016, pp. 1-152, 3GPP, France.

(Continued)

*Primary Examiner* — Christopher J Brown
(74) *Attorney, Agent, or Firm* — Coats & Bennett, PLLC

(57) ABSTRACT

The present disclosure relates to methods and apparatus for flexible, security context management during AMF changes. One aspect of the disclosure is a mechanism for achieving backward security during AMF changes. Instead of passing the current NAS key to the target AMF, the source AMF derives a new NAS key, provides the new NAS key to the target AMF, and sends a key change indication to the UE, either directly or through some other network node. The UE can then derive the new NAS key from the old NAS key. In some embodiments, the AMF may provide a key generation parameter to the UE to use in deriving the new NAS key. In other embodiments, the target AMF may change one or more security algorithms.

26 Claims, 30 Drawing Sheets

Related U.S. Application Data continuation of application No. PCT/EP2018/081943, filed on Nov. 20, 2018.

(60) Provisional application No. 62/588,856, filed on Nov. 20, 2017.

(51) Int. Cl.
  *H04W 36/00* (2009.01)
  *H04W 36/14* (2009.01)
  *H04L 9/40* (2022.01)
  *H04W 36/38* (2009.01)
  *H04W 12/041* (2021.01)

(52) U.S. Cl.
  CPC ....... *H04W 36/0038* (2013.01); *H04W 36/14* (2013.01); *H04W 36/385* (2013.01); *H04L 2463/061* (2013.01)

(58) Field of Classification Search
  USPC .......................................................... 713/171
  See application file for complete search history.

(56) References Cited

U.S. PATENT DOCUMENTS

| | | | |
|---|---|---|---|
| 8,712,054 | B2 | 4/2014 | Feng et al. |
| 9,084,110 | B2 | 7/2015 | Escott et al. |
| 9,538,373 | B2* | 1/2017 | He ................. H04L 63/0492 |
| 10,531,292 | B2 | 1/2020 | Ben Henda et al. |
| 10,873,464 | B2* | 12/2020 | Muhanna ............ H04L 9/0825 |
| 2007/0230707 | A1 | 10/2007 | Blom et al. |
| 2009/0209259 | A1 | 8/2009 | Brusilovsky et al. |
| 2010/0173610 | A1 | 7/2010 | Kitazoe et al. |
| 2011/0142239 | A1 | 6/2011 | Suh et al. |
| 2012/0077501 | A1 | 3/2012 | Zhang et al. |
| 2012/0159151 | A1* | 6/2012 | Janakiraman ......... H04L 43/028 713/153 |
| 2013/0003967 | A1 | 1/2013 | Norrman et al. |
| 2013/0028421 | A1 | 1/2013 | Feng et al. |
| 2013/0102270 | A1 | 4/2013 | Suh et al. |
| 2013/0128866 | A1 | 5/2013 | Zhang |
| 2013/0143532 | A1 | 6/2013 | Liu |
| 2014/0051442 | A1 | 2/2014 | Yang et al. |
| 2015/0208236 | A1 | 7/2015 | Xu et al. |
| 2016/0095036 | A1 | 3/2016 | Stojanovski et al. |
| 2017/0006469 | A1 | 1/2017 | Palanigounder |
| 2017/0078874 | A1 | 3/2017 | Lee et al. |
| 2017/0265108 | A1* | 9/2017 | Chen .................. H04W 12/041 |
| 2018/0063707 | A1 | 3/2018 | Lee et al. |
| 2018/0083972 | A1 | 3/2018 | Kim |
| 2019/0037454 | A1 | 1/2019 | Lee et al. |

FOREIGN PATENT DOCUMENTS

| | | |
|---|---|---|
| CN | 101478752 A | 7/2009 |
| CN | 101516089 A | 8/2009 |
| CN | 101835152 A | 9/2010 |
| CN | 101860863 A | 10/2010 |
| CN | 102948183 A | 2/2013 |
| JP | 2013516092 A | 5/2013 |
| RU | 2008148124 A | 6/2010 |
| WO | 2015113197 A1 | 8/2015 |
| WO | 2018138347 A1 | 8/2018 |
| WO | 2018138348 A1 | 8/2018 |
| WO | 2019097084 A1 | 5/2019 |

OTHER PUBLICATIONS

Intel Corporation (Rapporteur), "Report of email discussion: [96#34][NR} Inter-RAT mobility", 3GPP TSG-RAN WG2 NR Adhoc Meeting, Spokane, USA, Jan. 17, 2017, pp. 1-32, R2-1700320, 3GPP.

Ericsson, "Elaboration of flow details in procedure S1-based handover", 3GPP TSG-SA2 Meeting #67, Sophia Antipolis, France, Aug. 26, 2008, pp. 1-7, S2-086319, 3GPP.

CATT, "Handover consideration for 5G", SA WG2 Temporary Document, SA WG2 Meeting #118bis, Spokane, US, Jan. 16, 2017, pp. 1-5, S2-170254, 3GPP.

Nokia et al., "Security handling in mobility", 3GPP TSG SA WG3 (Security) Meeting #88-Bis, Singapore, Oct. 9, 2017, pp. 1-3, S3-172559, 3GPP.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 9)", Technical Specification, 3GPP TS 23.401 V9.16.0, Dec. 1, 2014, pp. 1-256, 3GPP, France.

Huawei et al., "Way forward discussion for interworking", SA WG2 Temporary Document, SA WG2 Meeting #118bis, Spokane, US, Jan. 16, 2017, pp. 1-5, S2-170048, 3GPP.

Ericsson, "Clause 8.3.1.3.3 (horizontal key derivation of K_AMF at N2-Handover)", 3GPP TSG SA WG3 (Security) Meeting #89, Reno, Nov. 27, 2017, pp. 1-2, S3-173096, 3GPP.

Ericsson, "Idle mode mobility with horizontal key derivation", 3GPP TSG SA WG3 (Security) Meeting #89, Reno, Nov. 27, 2017, pp. 1-2, S3-173386, 3GPP.

Ericsson, NEC, Clause 8.3.1.3.3 (key derivation during handover, N2)—pCR, 3GPP TSG SA WG3 (Security) Meeting #88Bis, Oct. 9-13, 2017, Singapore, S3-172567.

ZTE, China Unicom, Key hierarchy for 5G, 3GPP TSG SA WG3 (Security) Meeting #87, May 15-19, 2017, Ljubljana, Slovenia, S3-171605.

Ericsson, Security context management during AMF change, 3GPP TSG-SA WG3 Meeting #86, Sophia Antipolis, France, Feb. 6-10, 2017, S3-170274.

Ericsson (Rapporteur), Editorial corrections and allignment, SA @G2 Meeting #124, Nov. 27 -Dec. 1, 2017, Reno, Nevada (USA), S2-17xxxx.

3GPP TS 23.502 V0.1.1 (Jan. 2017) 3rd Generation Partnership Project; Technical Specification Group Services and Aspects; Procedures for the 5G System; Stage 2; (Release 15).

3GPP TS 36.331 V14.1.0 (Dec. 2016) 3rd Generation Partnership Project; Technical Specification Group Radio Access Network; Evolved Universal Terrestrial Radio Access (E-UTRA); Radio Resource Control (RRC); Protocol specification (Release 14).

3rd Generation Partnership Project, "3rd Generation Partnership Project; Technical Specification Group Services and System Aspects; General Packet Radio Service (GPRS) Enhancements for Evolved Universal Terrestrial Radio Access Network (E-UTRAN) Access (Release 14)", Technical Specification, 3GPP TS 23.401 V14.2.0, Dec. 1, 2016, pp. 1-385, 3GPP.

Ericsson et al., "Registration Procedure", SA WG2 Meeting #118BIS, Spokane, WA, USA, Jan. 16, 2017, pp. 1-8, S2-170669, 3GPP.

3rd Generation Partnership Project, "Digital cellular telecommunications system (Phase 2+); Universal Mobile Telecommunications System (UMTS); 3GPP System Architecture Evolution (SAE); Security architecture (3GPP TS 33.401 version 8.1.1 Release 8)", Technical Specification, ETSI TS 133 401 V8.1.1, Jan. 1, 2009, pp. 1-56, ETSI.

Disco Systems, Inc., "SAE-GW Administration Guide, StarOS Release 20", Mar. 31, 2016, pp. 595-608, Chapter 21, Cisco Systems, Inc., San Jose, US.

3rd Generation Partnership Project, "3rd Generation Partnership Project; Technical Specification Group Services and System Aspects; Study on the security aspects of the next generation system (Release 14)", Technical Report, 3GPP TR 33.899 V0.6.0, Nov. 25, 2016, pp. 64, 162, and 163, retrieved from Internet: https://www.3gpp.org/ftp/Specs/archive/33_series/33.899/33899-060.zip, 3GPP.

Ericsson, "Solution for the security anchor function based on a primary AMF", 3GPP TSG-SA WG3 Meeting#86 Sophia Antipolis, France, Feb. 6, 2017, pp. 1-4, S3-170277, Retrieved from internet: https://www.3gpp.org/ftp/tsg_sa/WG3_Security/TSGS3_86_Sophia/Docs/S3-170277.zip, 3GPP.

ZTE, Key hierarchy when using UPSF, 3GPP TSG SA WG3 (Security) Meeting #86Bis, Mar. 27-31, 2017, Busan, Korea, S3-170610.

(56) References Cited

OTHER PUBLICATIONS

3GPP, Technical Specification Group Services and System Aspects; Study on the security aspects of the next generation system (Release 14), TR 33.899 V0.6.0 (Nov. 2016), Nov. 25, 2016, pp. 44-45, 177, URL, http://www.3gpp.org/ftp//Specs/archive/33_series/33.899/33899-060.zip.

Ericsson, Security in NR, 3GPP TSG-RAN WG2 adhoc, Spokane, USA, Jan. 17-19, 2017, Tdoc R2-1700126.

* cited by examiner

SECURITY CONTEXT HANDLING IN 5G DURING HANDOVER

RELATED APPLICATIONS

This application is a continuation of U.S. patent application Ser. No. 16/235,632 filed 28 Dec. 2018, which is a continuation of PCT/EP2018/081943, filed 20 Nov. 2018, which claims the benefit of U.S. Provisional Application No. 62/588,856, filed 20 Nov. 2017. The disclosures of each of these references are incorporated in their entireties by reference herein.

TECHNICAL FIELD

The present disclosure relates generally to security in wireless communication networks and, more particularly, to methods and apparatus for security context handling during a handover of a user equipment.

BACKGROUND

The Third Generation Partnership Project (3GPP) is currently developing the standards for Fifth Generation (5G) systems. It is expected that 5G networks will support many new scenarios and use cases and will be an enabler for the Internet of Things (IoT). It is also expected that 5G systems will provide connectivity for a wide range of new devices such as sensors, smart wearables, vehicles, machines, etc. Flexibility will be a key property in 5G systems. This new flexibility is reflected in the security requirements for network access that mandate the support of alternative authentication methods and different types of credentials other than the usual Authentication and Key Agreement (AKA) credentials pre-provisioned by the operator and securely stored in the Universal Integrated Circuit Card (UICC). More flexible security features would allow factory owners or enterprises to leverage their own identity and credential management systems for authentication and access network security.

Among the new security features in 5G systems is the introduction of a Security Anchor Function (SEAF). The purpose of the SEAF is to cater to the flexibility and dynamicity in the deployment of the 5G core network functions, by providing an anchor in a secure location for key storage. In fact, the SEAF is expected to leverage virtualization to achieve the desired flexibility. As a consequence, the Access and Mobility Management Function (AMF), the 5G function responsible for access and mobility management, can be deployed in a domain that is potentially less secure than the operator's core network, while the master key remains in the SEAF in a secure location.

The SEAF is intended to establish and share a key denoted Kseaf with the user equipment (UE), that is used for deriving other keys, such as the keys for the control plane protection (e.g., Kcn key) and the radio interface protection. These keys generally correspond to the non-access stratum (NAS) keys and the access stratum key (KENB) in Long Term Evolution (LTE) systems. The SEAF is assumed to reside in a secure location and the Kseaf key would never leave the SEAF. The SEAF communicates with the AMFs and provision the necessary key material (derived from the Kseaf key) for the protection of the control plane (CP) and user plane (UP) traffic with the user equipment (UE). One advantage of this approach is that it avoids re-authentication each time a UE moves from an area served by one AMF to an area served by another AMF. In fact, authentication is a costly procedure in particular when the UE is roaming.

Recently, a proposal has been introduced to co-locate the SEAF and AMF, which defeats the purpose of the SEAF in the first place. It is worth noting that the security design in LTE systems was conceptually based on the assumption that the mobility management entity (MME), i.e. the node responsible for mobility management in LTE systems, is always located in a secure location within the operator core network. This assumption does not apply to the AMF in 5G systems. In dense areas, an AMF could be deployed closer to the edge of the network and thus potentially in exposed locations (e.g., in a shopping mall). Therefore, during an AMF change, it is possible that one of the AMFs is not located in an equally secure domain as the other, and therefore the target or the source AMF might need to shield itself from the other.

The Evolved Packet System (EPS) relied on the assumption that the MME is always located in a secure location. Therefore, during an MME change, the new MME simply fetched the security context of the UE from the previous MME. In addition, an MME may optionally trigger a new authentication for forward security.

With legacy mechanisms, forward security (i.e. the old MME does not know the security context used by the new MME) could be achieved via re-authentication but there was no mechanism for backward security (i.e. the new MME does not know the security context used by the old MME). The new AMF may trigger a new authentication thus eliminating any possibility for the old AMF to determine the new keys. The need for re-authentication could, for example, be based on an operator policy taking into account the location of the different AMFs.

Relying solely on the authentication procedure is not very efficient since, performance wise, it is one of the most costly procedures. Therefore, there remains a need to provide security when changing AMFs without the need for re-authentication.

SUMMARY

The present disclosure relates to methods and apparatus for flexible, security context management during AMF changes. One aspect of the disclosure is a mechanism for achieving backward security during AMF changes. Instead of passing the current NAS key to the target AMF, the source AMF derives a new NAS key, provides the new NAS key to the target AMF, and sends a key change indication to the UE, either directly or through some other network node. The UE can then derive the new NAS key from the old NAS key. In some embodiments, the source AMF may provide a key generation parameter to the UE to use in deriving the new NAS key. In other embodiments, the target AMF may change one or more security algorithms.

In another embodiment of the disclosure, a key change indication and/or key derivation parameter used to drive the new NAS key is sent from the target AMF to the target base station in a handover request. In response to the handover request, the target base station generates a handover command and sends the handover command to the target AMF. The handover command includes the key change indication and/or key derivation parameter. The target AMF generates and sends a transparent container to the source base station including the handover command. The transparent container is forwarded by the source AMF and source base station all the way down to the UE.

Other aspects and embodiments of the disclosure are included in the enumerated embodiments.

One aspect of the disclosure comprises a method implemented by a source base station in a wireless communication network for transferring a security context during a handover of a user equipment. The method comprises sending a first handover message to a source mobility management function in a core network of the wireless communication network to initiate a handover of a user equipment; receiving, responsive to the first handover message, a second handover message from the source mobility management function, the second handover message including a transparent container; forwarding the transparent container to the user equipment; receiving a key change indication indicating that a non-access stratum key has been changed; and forwarding the key change indication to the user equipment.

Another aspect of the disclosure comprises a source base station configured to perform the method of the preceding paragraph.

Another aspect of the disclosure comprises a method implemented by one or more core network nodes in a core network of a wireless communication network that provide a source mobility management function. The method comprises receiving, from a source base station in an access network of the wireless communication network, a first handover message indicating that a handover of a user equipment is needed; generating a new non-access stratum key; sending, responsive to the handover message, the new non-access stratum key to a target mobility management function in the core network of the wireless communication network; receiving, from the target mobility management function, a transparent container; and sending the transparent container to the user equipment in a second handover message; and sending a key change indication to the user equipment, said key change indication indicating that the non-access stratum key has been changed.

Another aspect of the disclosure comprises core network node configured to perform the method of the preceding paragraph.

Another aspect of the disclosure comprises a method implemented by one or more core network nodes in a core network of a wireless communication network that provide a target mobility management function. The method comprises receiving, from a source mobility management function in a core network, a new non-access stratum key; establishing a new security context based on the new non-access stratum key; receive an information block from the target base station, said information block including a key change indication indicating that a non-access stratum key has been changed; and sending, to the source mobility management function, a transparent container including the key change indication received from the target base station.

Another aspect of the disclosure comprises core network node configured to perform the method of the preceding paragraph.

Another aspect of the disclosure comprises a method implemented by a target base station in a wireless communication network. The method comprises receiving, from a target mobility management function, a handover request; generating, responsive to the handover request, an information block including a key change indication indicating that a non-access stratum key has been changed; and sending a transparent container with the key change indication to the target mobility management function for forwarding to the user equipment.

Another aspect of the disclosure comprises a target base station configured to perform the method of the preceding paragraph.

Another aspect of the disclosure comprises a method implemented by a user equipment in a wireless communication network. The method comprises receiving a handover message from a source base station in first mobility management domain of the wireless communication network, said handover message including a transparent container and a key change indication indicating that a non-access stratum key has been changed; performing a handover from the source base station to a target base station in a second mobility management domain of the wireless communication network; and establishing, responsive to the key change indication, a new security context with a target mobility management function, said new security context including a new non-access stratum key.

Another aspect of the disclosure comprises a user equipment configured to perform the method of the preceding paragraph.

Another aspect of the disclosure comprises a method implemented by a user equipment in a wireless communication network. The method comprises receiving a handover message from a source base station in first mobility management domain of the wireless communication network, said handover message including a transparent container and a key change indication indicating that a core network key has been changed; performing a handover from the source base station to a target base station in a second mobility management domain of the wireless communication network; and establishing, responsive to the key change indication, a new security context with a target mobility management function, said new security context including a new core network key.

Another aspect of the disclosure comprises a user equipment configured to perform the method of the preceding paragraph.

Another aspect of the disclosure comprises a method implemented by one or more core network nodes in a core network of a wireless communication network that provide a target mobility management function. The method comprises receiving, from a source mobility management function in a core network, a new core network key; establishing a new security context based on the new core network key; receive an information block from the target base station, said information block including a key change indication indicating that a new core network key has been changed; and sending, to the source mobility management function, a transparent container including the key change indication received from the target base station.

Another aspect of the disclosure comprises core network node configured to perform the method of the preceding paragraph.

Another aspect of the disclosure comprises computer programs to implement the methods described in the preceding paragraphs.

DETAILED DESCRIPTION

Figure 1:
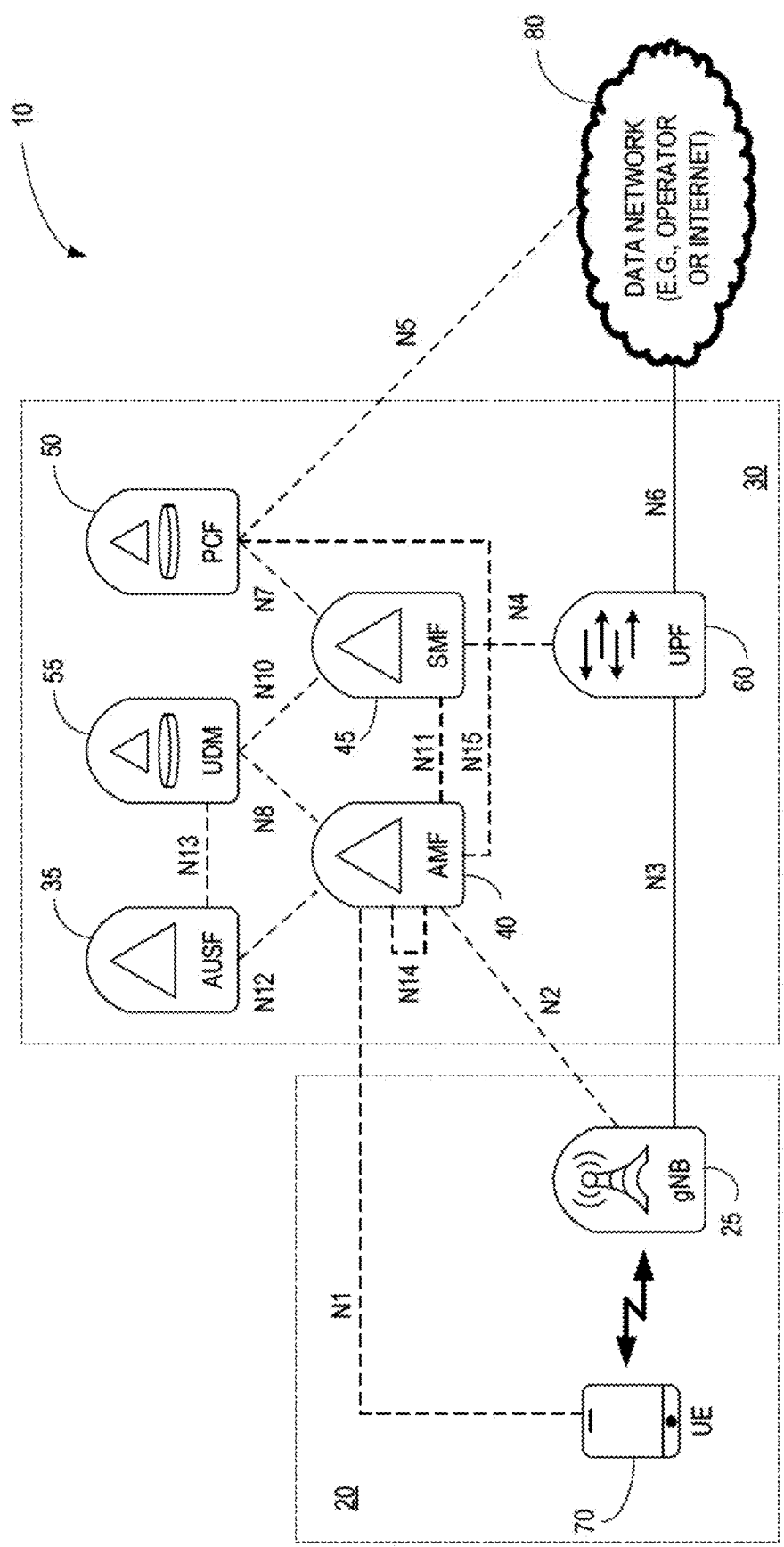
FIG. 1 illustrates an exemplary wireless communication network.

Referring now to the drawings, an exemplary embodiment of the disclosure will be described in the context of a 5G wireless communication network. Those skilled in the art will appreciate that the methods and apparatus herein described are not limited to use in 5G networks, but may also be used in wireless communication networks operating according to other existing and future standards.

FIG. 1 illustrates a wireless communication network 10 according to one exemplary embodiment. The wireless communication network 10 comprises a radio access network (RAN) 20 and a core network 30. The RAN 20 comprises one or more base stations 25 providing radio access to UEs 70 operating within the wireless communication network 10. The base stations 25 are also referred to as gNodeBs (gNBs). The core network 30 provides a connection between the RAN 20 and other packet data networks 80.

In one exemplary embodiment, the core network 30 comprises an authentication server function (AUSF) 35, access and mobility management function (AMF) 40, session management function (SMF) 45, policy control function PCF 50, unified data management (UDM) function 55, and user plane function (UPF) 60. These components of the wireless communication network 10 comprise logical entities that reside in one or more core network nodes. The functions of the logical entities may be implemented by one or more processors, hardware, firmware, or a combination thereof. The functions may reside in a single core network node, or may be distributed among two or more core network nodes.

The AMF 40, among other things, performs mobility management functions similar to the MME in LTE. The AMF and MME are referred to herein generically as mobility management functions. In the exemplary embodiment shown in FIG. 1, the AMF 40 is the termination point for non-access stratum (NAS) security. The AMF 40 shares a key, denoted the core network key (Kcn), with the UE 70 that is used to derive the NAS lower level protocol keys for integrity and confidentiality protection. The Kcn is generally equivalent to the Kasme in the Evolved Packet System (EPS), or the KAMF key. It is always the case that following authentication, a new Kcn is taken into use. How the Kcn key is established after authentication is not a material aspect of the present disclosure. The methods and apparatus described herein do not depend on the particular method used for computing Kcn after authentication. That is, the security context handling methods work regardless of whether the Kcn is derived from a higher level key or is established directly by the authentication procedure similar to the establishment of Kasme in EPS. In an embodiment, the security context is a 5G Security Context, which comprises a 5G NAS Security Context and a 5G AS Security context. In another embodiment, the security context is the 5G NAS Security Context.5G NAS security context consists in one embodiment of KAMF, a key set identifier associated with the KAMF, UE security capabilities (???), and an uplink NAS COUNT value and a downlink NAS COUNT value. Once a UE 70 is authenticated, the UE 70 may move between cells within the network. When a UE 70 moves between cells while in a connected mode, a handover is executed. When a UE 70 in idle mode moves between cells, a location update procedure may be executed. The AMF 40 keeps track of the location of the UE 70 in its domain. Typically, the core network 30 will have multiple AMFs 40, each providing mobility management services in a respective domain. When a UE 70 moves between cells supervised by different AMFs 40, the security context needs to be transferred from the source AMF 40 to the target AMF 40.

In LTE systems, the security context is transferred unaltered from a source mobility management entity (MME) to the target MME during an inter-MME handover or location update. Following an AMF change, a NAS security mode command (SMC) may be performed, which takes new NAS and access stratum (AS) keys into use. Generation of NAS and AS keys may be necessary, for example, when an algorithm change is needed at the NAS level. Generally, changing the algorithm used at the NAS protocol layer does not have any effect on the AS keys. However, changing the main NAS context key renders the current AS keys outdated.

One aspect of the disclosure is a mechanism for achieving backward security during AMF changes. Instead of passing the current NAS key to the target AMF 40, the source AMF 40 derives a new NAS key, provides the new NAS key to the target AMF 40, and sends a key change indication to the UE 70. The UE 70 can then derive the new NAS key from the old NAS key. In some embodiments, the source AMF 40 may provide a key generation parameter to the UE 70 to use in deriving the new NAS key. In other embodiments, the target AMF 40 may change one or more security algorithms.

Figure 2:
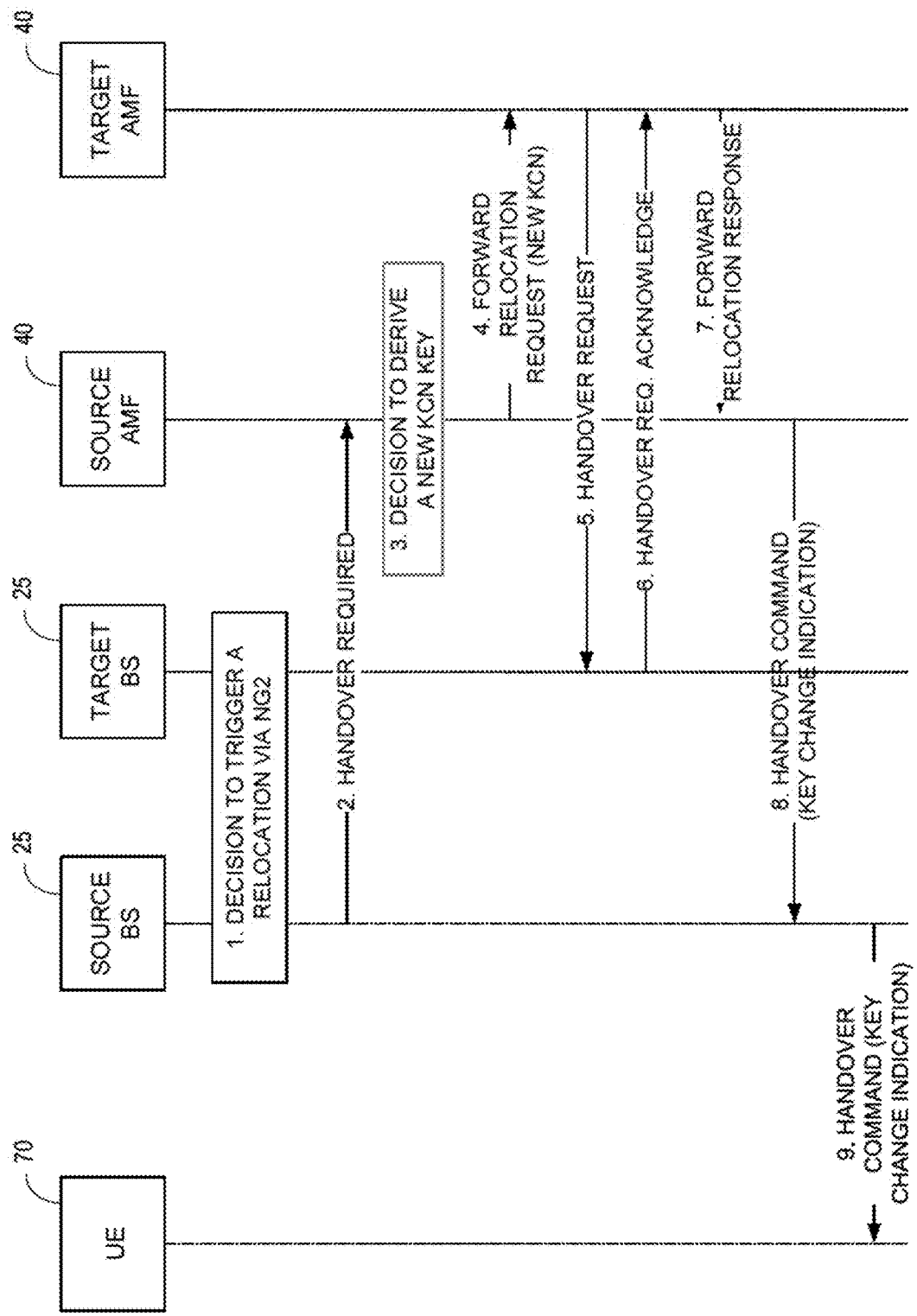
FIG. 2 illustrates a procedure for security context handling during a handover.

FIG. 2 illustrates an exemplary procedure for transferring a security context during a handover where the AMF changes. The procedure shown in FIG. 2 is based on the S-1 handover procedure from 3GPP specification TS 23.401, § 5.5.1.2.2 with modifications to handle a change in the NAS key. At step 1, the source base station 25 (e.g., source gNB) decides to initiate an N2-based handover due, for example, to no Xn connectivity to the target base station 25 (e.g. target gNB). The Xn interface is the 5G equivalent of the X2 interface in EPS. At step 2, the source base station 25 sends a handover required message (or 5G equivalent of handover required message) to the source AMF 40. This is the AMF 40 currently serving the UE 70, with which it shares a full NAS security context based on a Kcn key. The Kcn key was established possibly following a previous authentication or AMF 40 change procedure. At step 3, the source AMF 40 selects the target AMF 40 and decides to derive a new Kcn key in order to shield itself and all the previous sessions from the target AMF 40. The decision to derive a new key may be based on operator specific security policy. At step 4, the source AMF 40 sends a forward relocation request message (or 5G equivalent) including the new Kcn key along with any relevant security parameters, such as the UE capabilities. The target AMF 40 uses this Kcn key to set up a new security context and derive a new AS key.

At step 5, the target AMF 40 sends a handover request (or 5G equivalent) to the target base station 25. The handover request includes the new AS key and all relevant security parameters, such as the UE capabilities. This establishes the UE 70 security context at the target base station 25. At step 6, the target base station 25 acknowledges the handover request. Responsive to the acknowledgement, the target AMF 40 sends, at step 7, a forward relocation response message (or 5G equivalent) including a target to source transparent container to the source AMF 40. This container is forwarded all the way down to the UE 70 in steps 8 and 9.

At steps 8 and 9, the source AMF 40 sends a handover command message to the UE 70 via the source base station 25, which forwards the handover command to the UE 70. The handover command message from the source AMF 40 to the source base station 25 includes the relevant information from the forward relocation response message (e.g. target to source transparent container, bearers subject to forwarding, bearers to release, etc.) and a key change indication indicating that a new Kcn has been derived. The key change indication may comprise an explicit key change indicator flag set to a value indicating that the Kcn key has been changed. Responsive to the key change indication, the UE 70 establishes a new security context and derives a new Kcn. The UE 70 uses the new Kcn key to derive a new AS key for communicating with the target base station 25.

Figure 3:
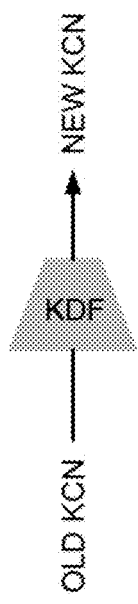
FIG. 3 illustrates a first exemplary key generation procedure.

FIG. 3 illustrates a first key derivation procedure. In this embodiment, it is assumed that the key derivation function (KDF) derives the new Kcn key based solely on the old Kcn key. This key chaining from AMF 40 to AMF 40 may continue on until a new authentication is performed. It may be left to the operator's policy how to configure the AMF 40 in respect to which security mechanism is selected during an AMF 40 change. For example, depending on an operator's security requirements, the operator can decide whether to perform re-authentication at the target AMF 40, or whether a key change is needed at the source AMF 40.

Figure 4:
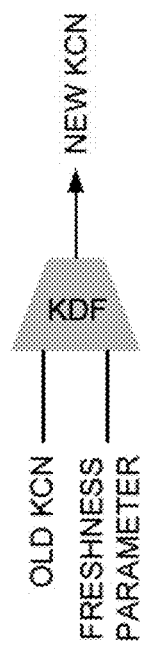
FIG. 4 illustrates a second exemplary key generation procedure

FIG. 4 illustrates another key derivation procedure. This embodiment may be useful in scenarios where an AMF 40 needs to prepare keys in advance for more than one potential target AMF 40. In this case, an additional key derivation parameter is needed for cryptographic separation, so that different Kcn keys are prepared for different potential target AMFs. Depending on the parameter type, the UE 70 might need to be provided with the chosen key derivation parameter in addition to the key change indication. In some embodiments, the key derivation parameter my also serve as an implicit key change indication so that a separate key change indication is not required. For example, where the key derivation parameter comprises a nonce generated by the source AMF 40, the nonce needs to be provided to the UE 70. Other potential key derivation parameters include a timestamp, a version number, and a freshness parameter. However, in scenarios where the key change parameter is otherwise available to the UE 70, such as an AMF 40 public identifier-like parameter, it may not be necessary to provide the UE 70 with the key derivation parameter.

Figure 5:
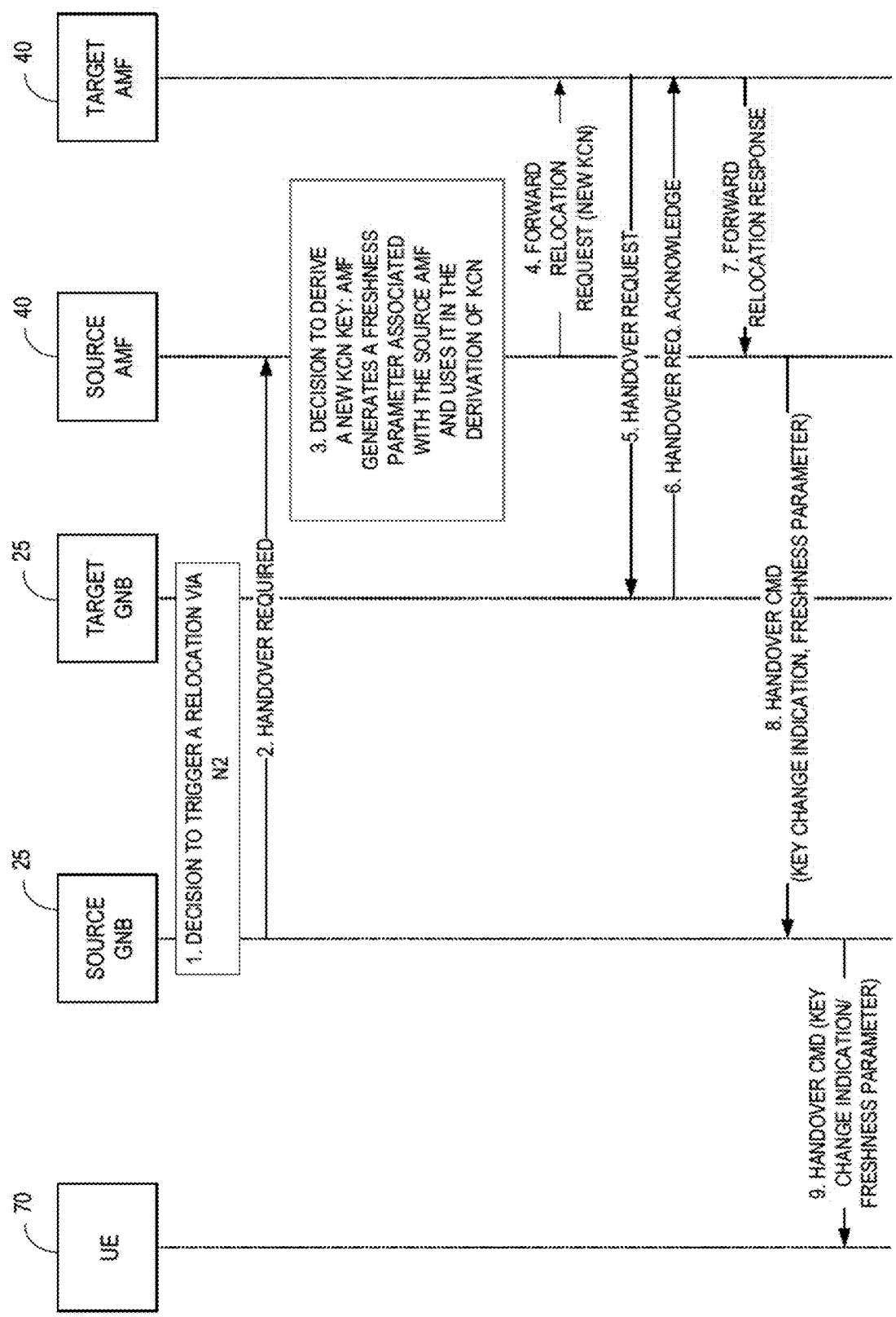
FIG. 5 illustrates second procedure for security context handling during a handover.

FIG. 5 illustrates a handover procedure where a freshness parameter or other key derivation parameter is used to derive the new Kcn key. This procedure is generally the same as the procedure shown in FIG. 2. For the sake of brevity, steps that are unchanged are not described. At step 3, the source AMF 40 selects the target AMF 40 and decides to derive a new Kcn key in order to shield itself and all the previous sessions from the target AMF 40. In this embodiment, the source AMF 40 generates a freshness parameter (e.g., version number) and uses the freshness parameter to derive the new Kcn key. At step 4, the source AMF 40 sends a forward relocation request message (or 5G equivalent) including the new Kcn key along with any relevant security parameters, such as the UE capabilities. The target AMF 40 uses this Kcn key to set up a new security context and derive a new AS key. The source AMF 40 does not provide the freshness parameter to the new AMF 40. Instead, at step 8, the source AMF 40 sends a handover command to the source base station 25, wherein the handover command includes the freshness parameter in addition to or in place of the key change indication. As noted above, the freshness parameter may serve as an implicit key change indication. Responsive to the key change indication and/or freshness parameter, the UE 70 establishes a new security context and derives a new Kcn using the freshness parameter. The UE 70 may use the new Kcn key to derive a new AS key for communicating with the target base station 25.

Figure 6:
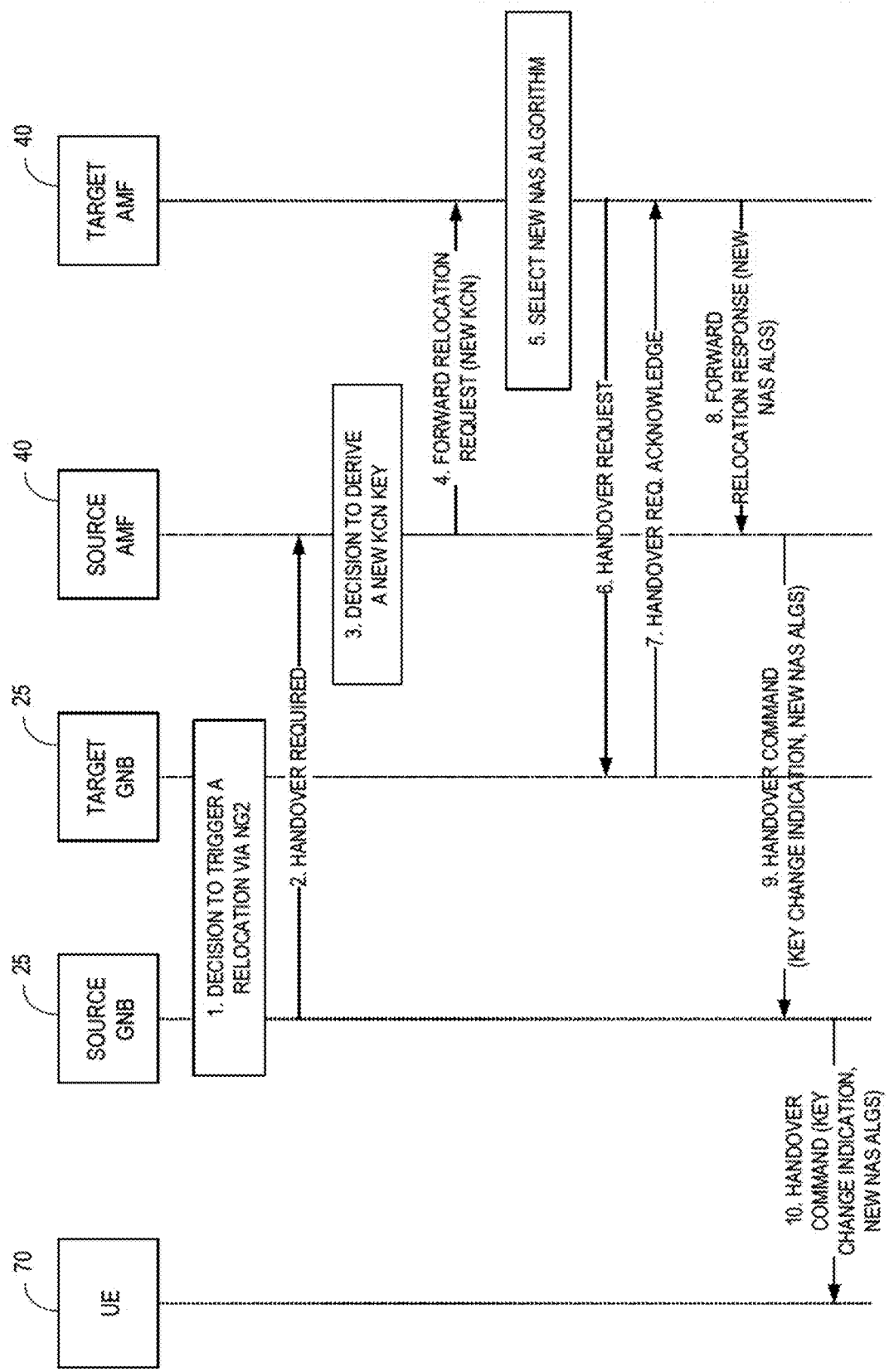
FIG. 6 illustrates a third procedure for security context handling during a handover.

In LTE systems, a NAS algorithm change at the target AMF 40 can only take effect through a NAS SMC procedure. Since the UE 70 capabilities are sent with other UE 70 context information to the target AMF 40, it is possible for the target AMF 40 to indicate which new NAS algorithms have been selected. FIG. 6 illustrates an exemplary handover procedure where the target AMF 40 selects one or more new NAS security algorithms (e.g., cryptographic algorithms). Steps 1-4 are the same as described in FIG. 2. At step 5, the target AMF 40 selects one or more new NAS security algorithms. Steps 6 and 7 are the same as steps 5 and 6 in FIG. 2. At step 8, the target AMF 40 includes an indication of the new security algorithms in the transparent container to the source information element of the forward relocation response message sent to the source AMF 40. This container is forwarded all the way down to the UE 70 in steps 9 and 10. The security algorithm indication may be included with the key change indication in the handover command, or in a separate message. As a consequence, the UE 70 has all the necessary parameters to activate the NAS security context with the target AMF 40 without the need of a NAS SMC. This mechanism works regardless how the Kcn key is derived.

Figure 7:
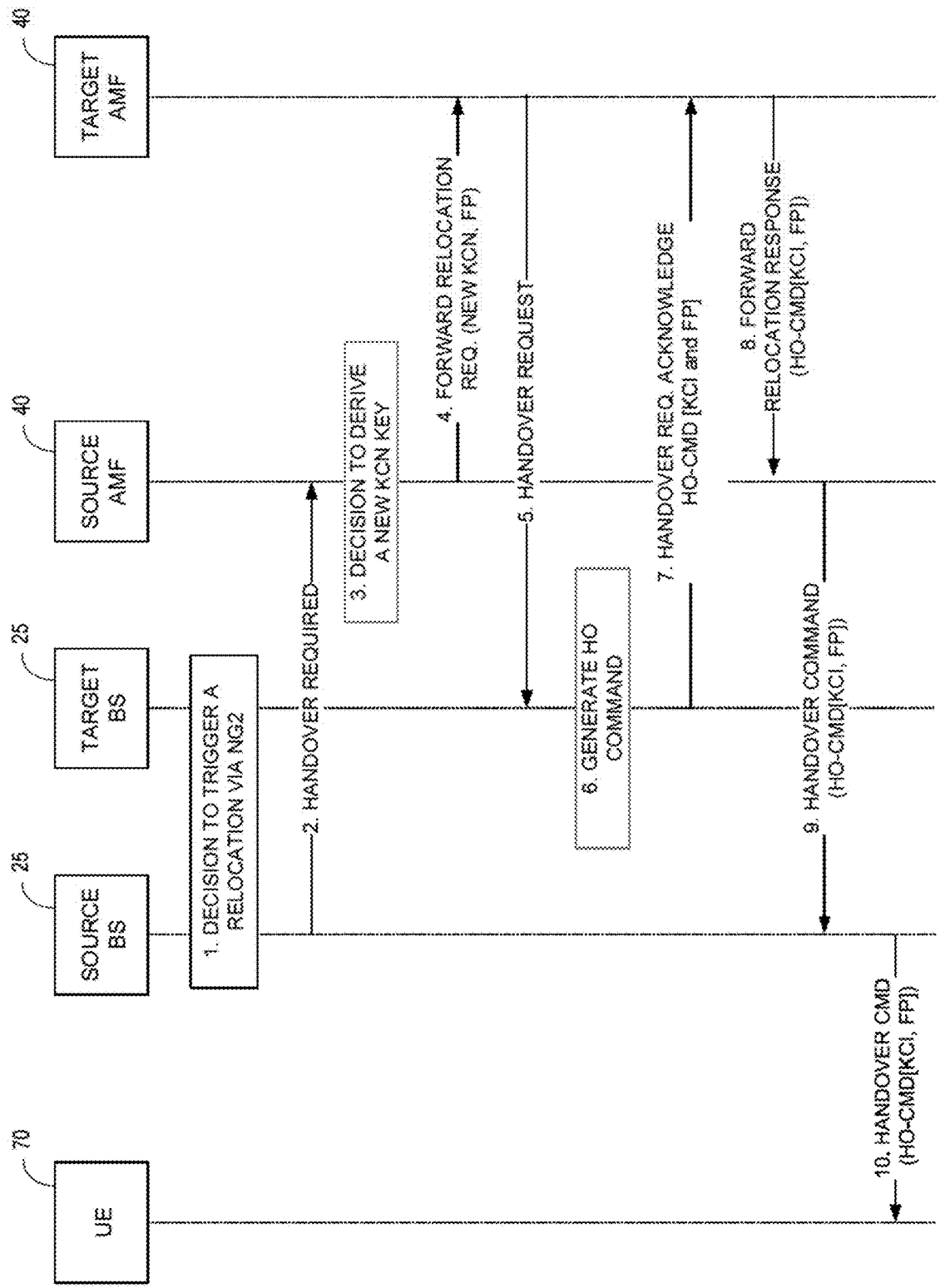
FIG. 7 illustrates a fourth procedure for security context handling during a handover.

FIG. 7 illustrates an exemplary handover procedure where the target base station 25 generates a handover command, denoted HO-CMD, including the key change indication and/or key derivation parameter. Steps 1-3 are the same as described in FIG. 2. At step 4, the source AMF 40 sends a forward relocation request message (or 5G equivalent) including the new KCN key along with any relevant security parameters, such as the UE capabilities, to the target AMF 40. In this embodiment, the source AMF 40 also includes a freshness parameter or other key derivation parameter used to derive the new KCN key in the forward relocation request. The target AMF 40 uses this KCN key to set up a new security context and derive a new AS key.

At step 5, the target AMF 40 sends a handover request (or 5G equivalent) to the target base station 25. The handover request includes a key change indication, along with the freshness parameter received from the source AMF 40 and all relevant security parameters, such as the new AS key and the UE capabilities. As noted above, the key change indication may comprise an explicit key change indicator flag set to a value indicating that the KCN key has been changed. The key derivation parameter may also serve as an implicit key change indication. This establishes the UE 70 security context at the target base station 25.

At steps 6 and 7, the target base station 25 generates the handover command HO-CMD and sends the handover command HO-CMD to the target AMF 40 in a handover request acknowledgement message. In one embodiment, the handover command HO-CMD includes the key change indication and key derivation parameter received from the target AMF 40. In other embodiments, the key change indication and freshness parameter are sent separately from the handover command HO-CMD, either as separate information elements in the handover request acknowledgement, or in separate messages. In this case the key change indication and key derivation parameter may be sent together. In one embodiment, the handover command HO-CMD is transmitted to the target AMF in an RRC transparent container or other information block. The RRC transparent container or information block may also include the key change indication and/or key derivation parameter (e.g. freshness parameter) if not already included in the handover command HO-CMD.

Responsive to the handover request acknowledgement, the target AMF 40 sends, at step 8, a forward relocation response message (or 5G equivalent) including a target to source transparent container to the source AMF 40. The target to source transparent container includes the handover command HO-CMD generated by the target base station 25. The target to source transparent container may further include the key change indication and/or freshness parameter, either as part of the handover command HO-CMD, or as separate information elements. This container is forwarded all the way down to the UE 70 in steps 9 and 10.

At steps 9 and 10 the source AMF 40 sends a handover command message to the UE 70 via the source base station 25. It should be noted that the handover command messages sent in steps 8 and 9 are different from the handover command HO-CMD generated by the target base station 25, which is included in the handover command messages sent at steps 8 and 9. The handover command message from the source AMF 40 to the source base station 25 sent at step 8 includes the target to source transparent container with the handover command HO-CMD from the target base station 25. The source base station 25 constructs the handover command message sent at step 10 using the target to source transparent container. In one embodiment, the handover command message sent at step 10 from the source base station 25 to the UE 70 includes the target to source transparent container with the HO-CMD and possibly the key change indication and/or key derivation parameter. Responsive to the key change indication, the UE 70 establishes a new security context and derives a new KCN. The UE 70 uses the new KCN key to derive a new AS key for communicating with the target base station 25.

In some embodiments of the disclosure, the freshness parameter can be omitted if the UE 70 is able to determine it through other means (e.g., from data broadcast by the base station or from other data known to the UE).

Figure 8:
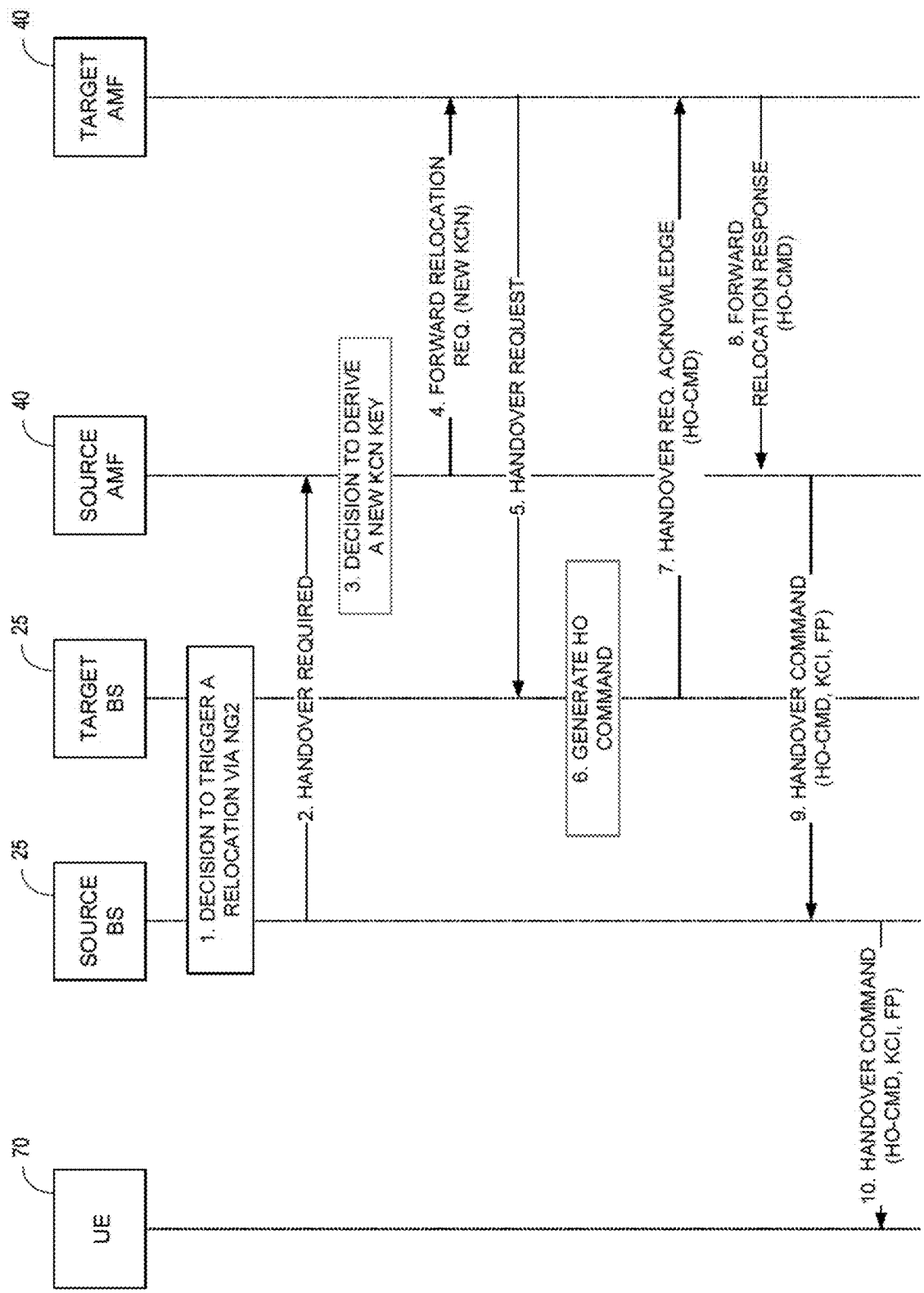
FIG. 8 illustrates a fifth procedure for security context handling during a handover.

FIG. 8 illustrates another handover procedure where the target base station generates a handover command HO-CMD. Steps 1-3 are the same as described in FIGS. 2 and 7. At step 4, the source AMF 40 sends a forward relocation request message (or 5G equivalent) including the new KCN key along with any relevant security parameters, such as the UE capabilities, to the target AMF 40. In this embodiment, the source AMF 40 does not include the freshness parameter or other key derivation parameter used to derive the new KCN key in the forward relocation request. The target AMF 40 uses this KCN key to set up a new security context and derive a new AS key.

At step 5, the target AMF 40 sends a handover request (or 5G equivalent) to the target base station 25. The handover request includes the new AS key and all relevant security parameters, such as the UE capabilities. This establishes the UE 70 security context at the target base station 25. At steps 6 and 7, the target base station 25 generates the handover command HO-CMD and sends the handover command HO-CMD to the target AMF 40 in a handover request acknowledgement message as previously described. Responsive to the handover request acknowledgement message, the target AMF 40 sends, at step 8, a forward relocation response message (or 5G equivalent) including a target to source transparent container to the source AMF 40. The target to source transparent container includes the handover command HO-CMD generated by the target base station 25. This container is forwarded all the way down to the UE 70 in steps 9 and 10.

At steps 9 and 10 the source AMF 40 sends a handover command message to the UE 70 via the source base station 25. The handover command message sent from the source AMF 40 to the source base station 25 includes the handover command HO-CMD from the target base station 25 in the target to source transparent container. The handover command message further includes a key change indication, and the key derivation parameter (e.g. freshness parameter) used to derive the new KCN key. As noted above, the key change indication may comprise an explicit key change indicator flag set to a value indicating that the KCN key has been changed. The source base station 25 constructs the handover command message sent at step 10 using the target to source transparent container. In one embodiment, the handover command message sent at step 10 from the source base station 25 to the UE 70 includes the target to source transparent container. The key derivation parameter may also serve as an implicit key change indication. Responsive to the key change indication, the UE 70 establishes a new security context and derives a new KCN. The UE 70 uses the new KCN key to derive a new AS key for communicating with the target base station 25.

Figure 9:
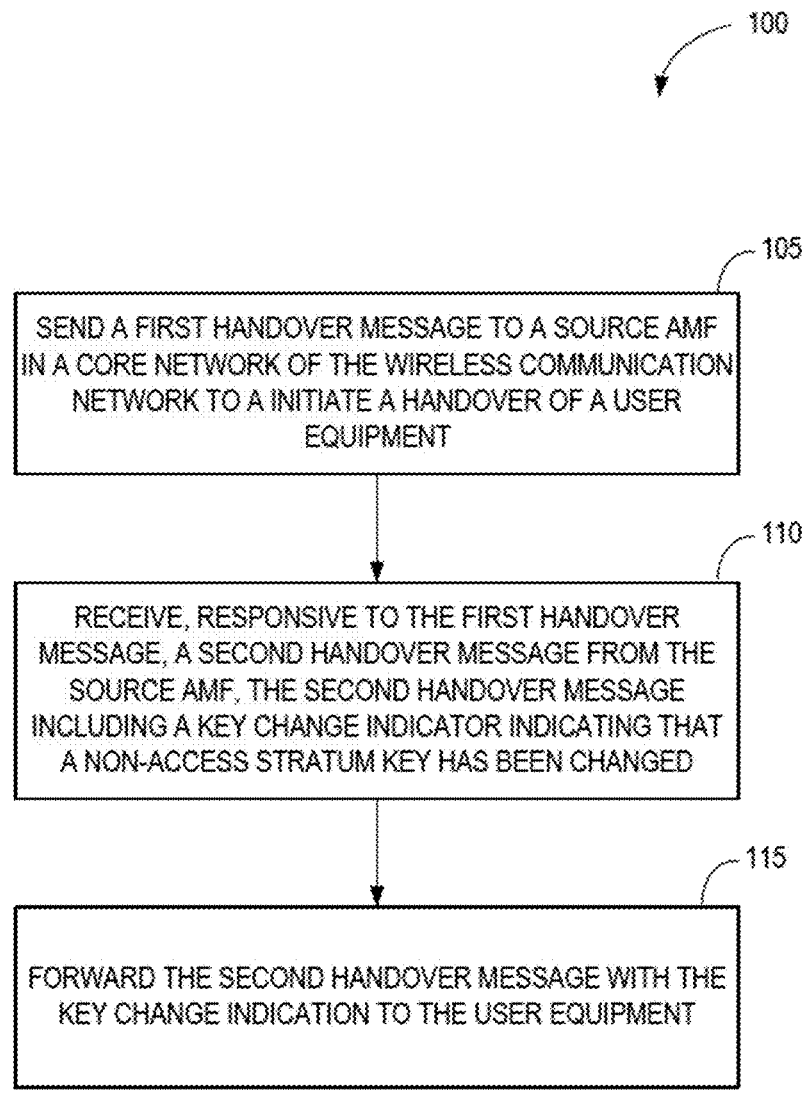
FIG. 9 illustrates a method implemented by a source base station during a handover.

FIG. 9 illustrates an exemplary method 100 implemented during a handover by a source base station 25 in an access network of a wireless communication network 10. The source base station 25 sends a first handover message to a source AMF 40 in a core network 30 of the wireless communication network 10 to initiate a handover of a UE 70 (block 105). Subsequently, the source base station 25 receives, responsive to the first handover message, a second handover message from the source AMF 40 (block 110). The second handover message includes a key change indication indicating that a non-access stratum key has been changed. The source base station 25 forwards the second handover message with the key change indication to the UE 70 (block 115).

Figure 10:
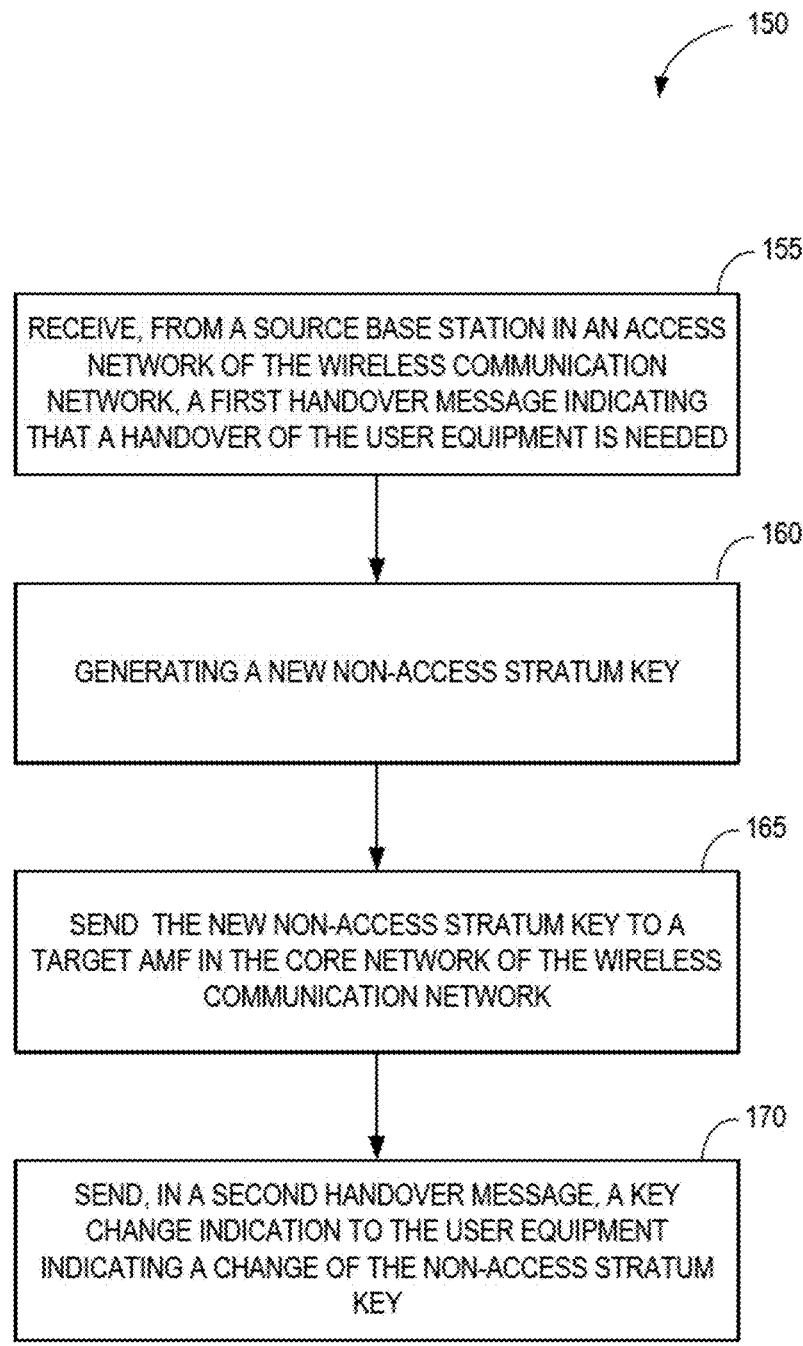
FIG. 10 illustrates a method implemented by a source AMF during a handover.

FIG. 10 illustrates an exemplary method 150 implemented during a handover by a source AMF 40 in a core network 30 of a wireless communication network 10. The source AMF 40 receives, from the source base station 25, a first handover message indicating that a handover of the UE 70 is needed (block 155). The source AMF generates a new non-access stratum key (block 160), and sends the new non-access stratum key to a target AMF 40 in the core network 30 of the wireless communication network 10 (block 165). The source AMF 40 also sends a key change indication to the UE 70 in a second handover message (block 170). The key change indication indicates a change of the non-access stratum key.

Figure 11:
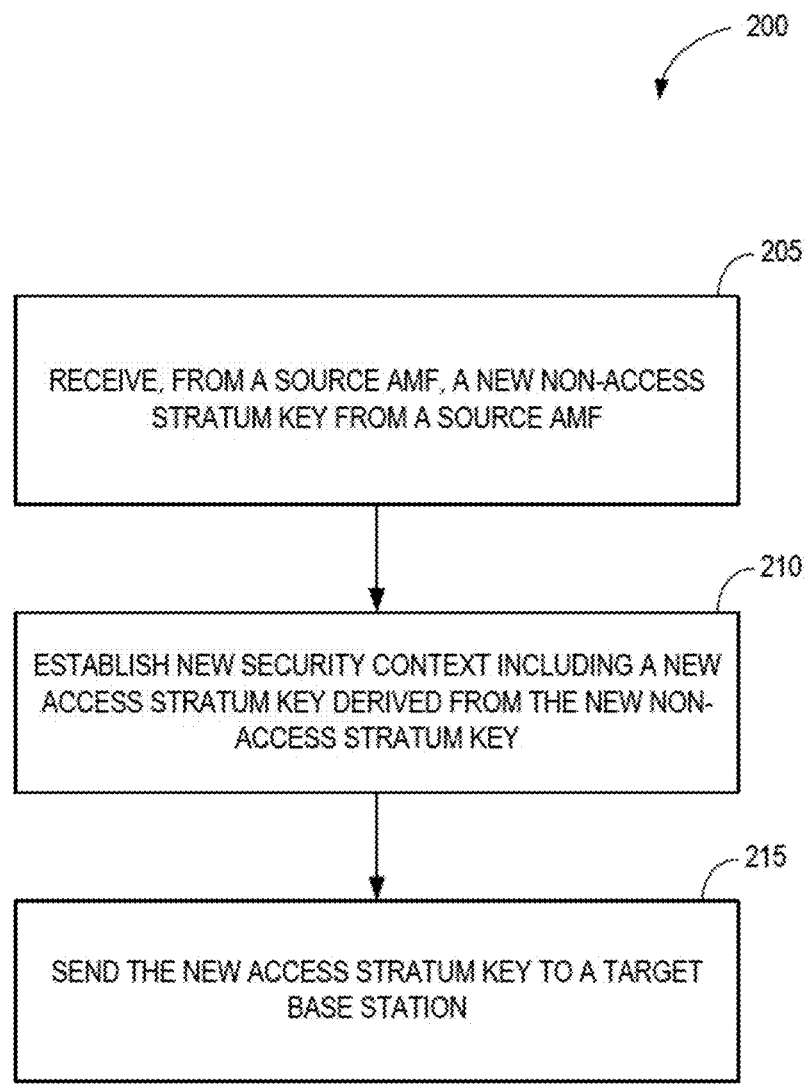
FIG. 11 illustrates a method implemented by a target AMF during a handover.

FIG. 11 illustrates an exemplary method 200 implemented during a handover by a target AMF 40 in a core network 30 of a wireless communication network 10. The target AMF 40 receives, from the source AMF 40, a new non-access stratum key (block 205). The target AMF establishes a new security context including a new access stratum key derived from the new non-access stratum key (block 210), and sends the new access stratum key to a target base station 25 (block 215).

Figure 12:
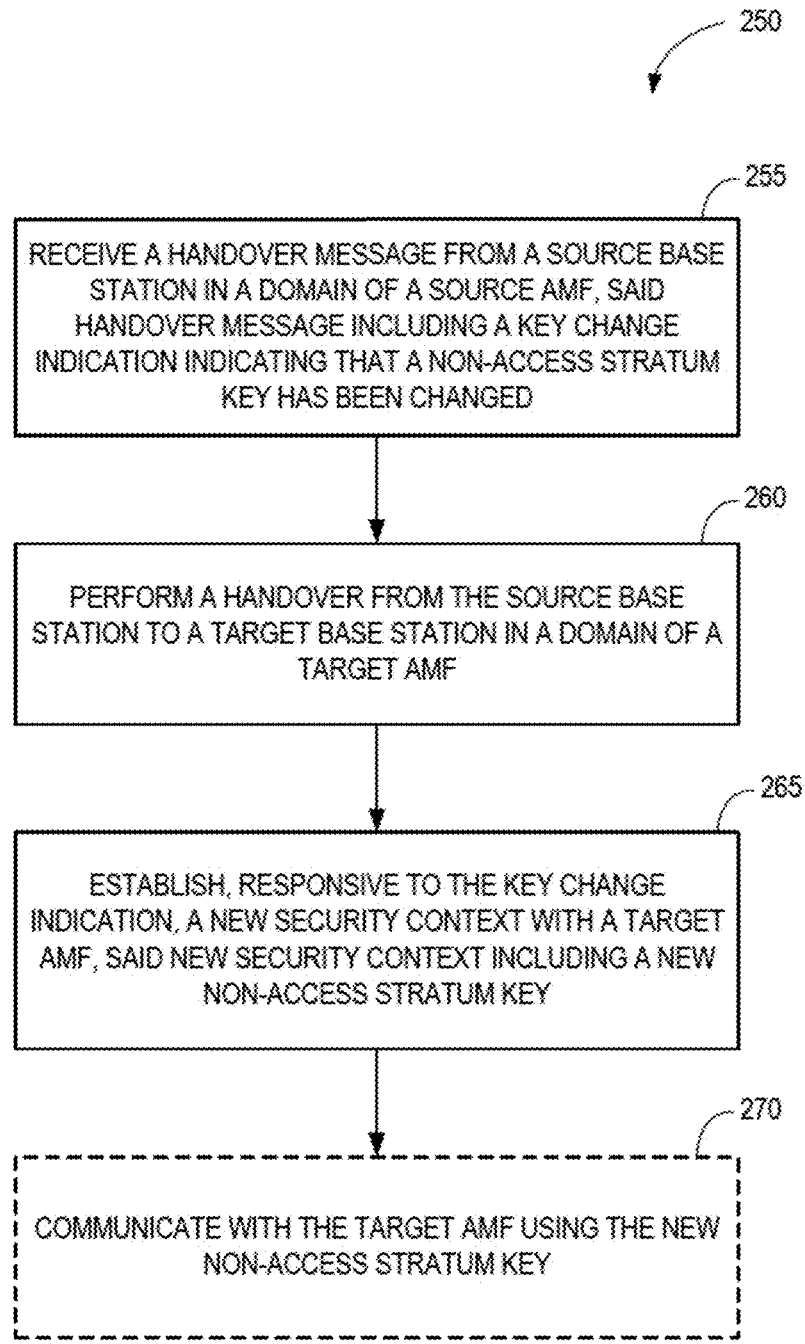
FIG. 12 illustrates a method implemented by a UE during a handover.

FIG. 12 illustrates an exemplary method 250 implemented by a UE 70 in a wireless communication network 10 during a handover. The UE 70 receives a handover message including a key change indication from a source base station 25 in the domain of a source AMF 40 of the wireless communication network 10 (block 255). The key change indication indicates to the UE 70 that a non-access stratum key has been changed. The UE 70 performs a handover from the source base station 25 to a target base station 25 in a domain of a target AMF 40 (block 260). The UE 70 establishes, responsive to the key change indication, a new security context with the target AMF 40 (block 265). The new security context includes a new non-access stratum key. The UE 70 may optionally communicate with the target AMF 40 using the new non-access stratum key (block 270).

Figure 13:
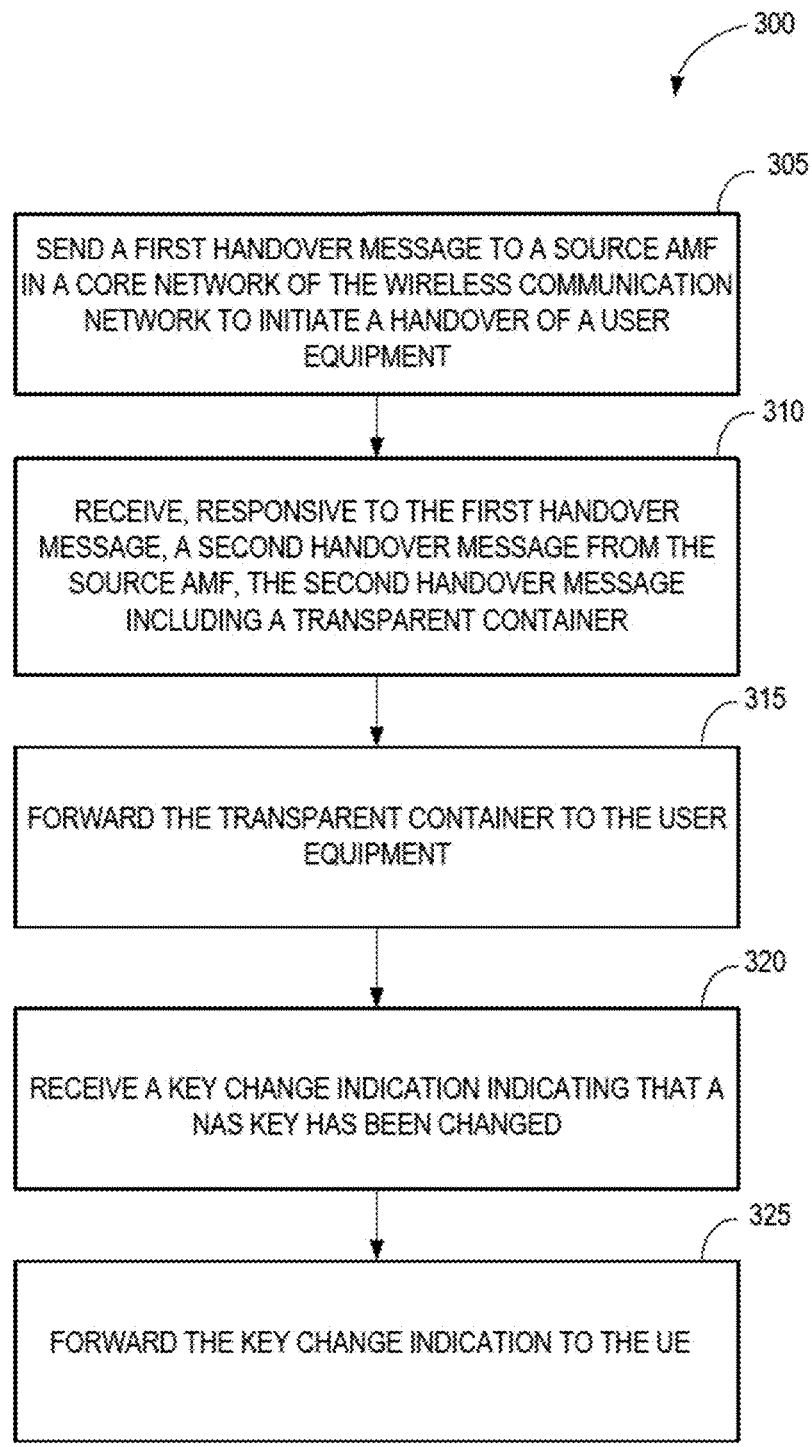
FIG. 13 illustrates another method implemented by a source base station during a handover.

FIG. 13 illustrates an exemplary method 300 implemented during a handover by a source base station 25 in an access network of a wireless communication network 10. The source base station 25 sends a first handover message to a source AMF 40 in a core network 30 of the wireless communication network 10 to initiate a handover of a UE 70 (block 305). Subsequently, the source base station 25 receives, responsive to the first handover message, a second handover message including a transparent container from the source AMF 40 (block 310). In one embodiment, the transparent container includes a handover command generated by a target base station. The source base station 25 forwards the transparent container to the UE 70 (block 315). The source base station 25 also receives a key change indication indicating that a non-access stratum key has been changed (block 320) and forward the key change indication to the user equipment (block 325). In one embodiment, the key change indication is received along with the handover command in the transparent container. In other embodiments, the key change indication is received along with the transparent container in the second handover message.

In some embodiments of the method 300, the key change indication is received from the source AMF in the transparent container and forwarded to the UE 70 in the transparent container.

In some embodiments of the method 300, the key change indication comprises a key change indicator flag set to a value indicating that the non-access stratum key has been changed.

In some embodiments of the method 300, the key change indication comprises a security parameter implicitly indicating that the non-access stratum key has been changed. The security parameter may comprises one of a nonce, timestamp, and freshness parameter.

Some embodiments of the method 300 further comprise receiving, from the source AMF 40, a key derivation parameter needed by the UE 70 to generate a new non-access stratum key; and forwarding the key derivation parameter to the UE 70. The key derivation parameter may comprise one of a nonce, timestamp, and freshness parameter. In some embodiments, the key derivation parameter is received with the key change indication in the transparent container and forwarded to the UE 70 in the transparent container. In some embodiments, the key derivation parameter serves as an implicit key change indication.

Some embodiments of the method 300 further comprise receiving, from the source AMF 40, a security algorithm parameter indicating at least one security algorithm to be used by the UE 70; and forwarding the security algorithm parameter to the UE 70. In some embodiments, the security algorithm parameter is received in the second handover message.

In some embodiments of the method 300, the first handover message comprises a handover required message indicating a need for a handover of the UE 70.

In some embodiments of the method 300, the second handover message comprises a handover command including the transparent container.

In some embodiments of the method 300, the non-access stratum key comprises a core network key (KCN).

Figure 14:
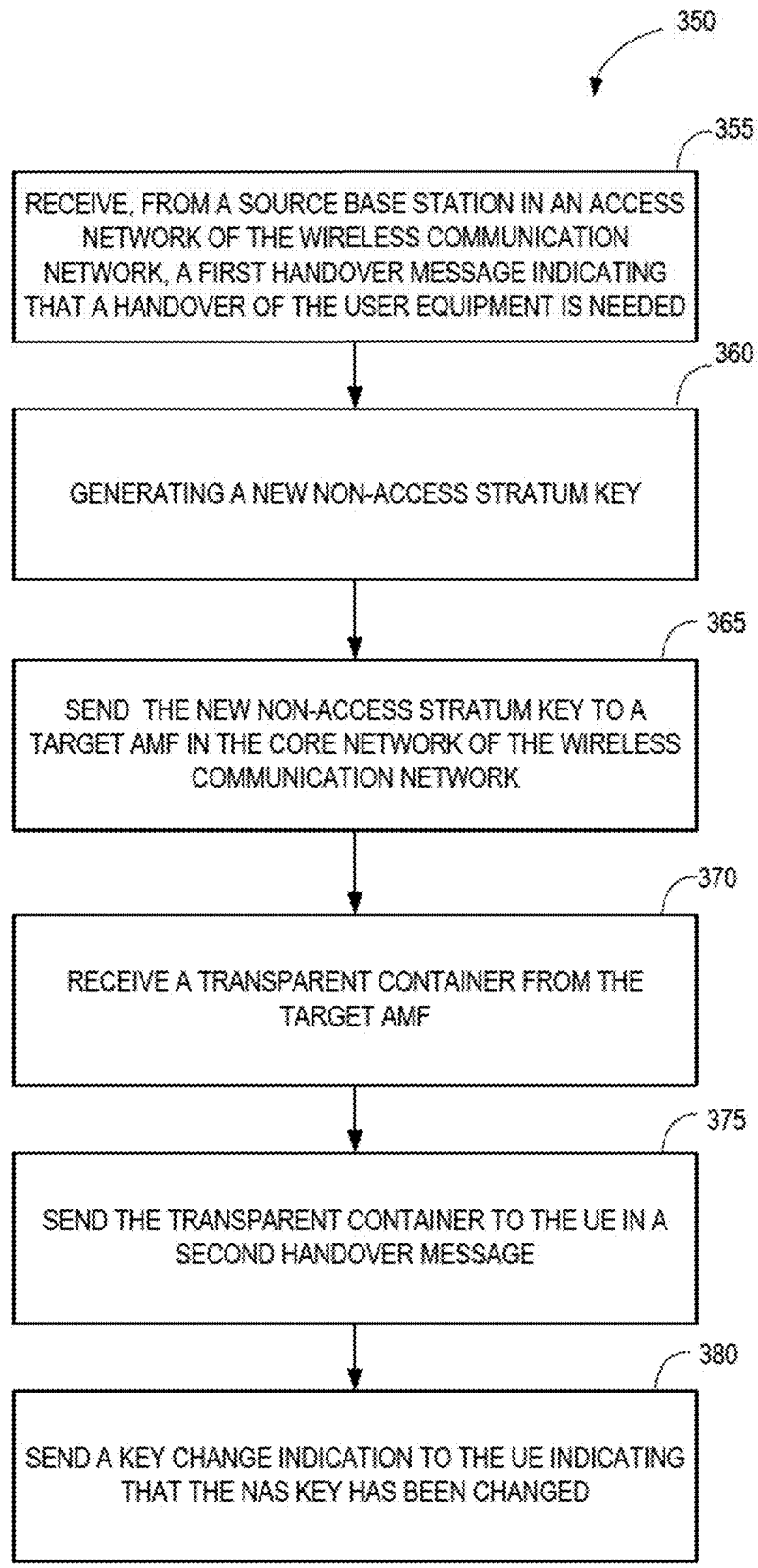
FIG. 14 illustrates another method implemented by a source AMF during a handover.

FIG. 14 illustrates an exemplary method 350 implemented during a handover by a source AMF 40 in a core network 30 of a wireless communication network 10. The source AMF 40 receives, from the source base station 25, a first handover message indicating that a handover of the UE 70 is needed (block 355). The source AMF generates a new non-access stratum key (block 360), and sends the new non-access stratum key to a target AMF 40 in the core network 30 of the wireless communication network 10 (block 365). The source AMF 40 receives, from the target AMF 40, a transparent container (block 370). In one embodiment, the transparent container includes a handover command generated by a target base station. The source AMF 40 sends the transparent container to the UE 70 in a second handover message (block 375). The source AMF 40 also sends a key change indication to the UE 70 (block 380).

The key change indication indicates a change of the non-access stratum key. In one embodiment, the key change indication is sent along with the transparent container in the second handover message. In other embodiments, the key change indication is sent along with the handover command in the transparent container.

Some embodiments of the method 350 further comprise receiving the key change from the target AMF 40 in the transparent container; and forwarding the transparent container with the key change indication to the UE 70.

In some embodiments of the method 350, the key change indication comprises a key change indicator flag set to a value indicating that the non-access stratum key has been changed.

In some embodiments of the method 350, the key change indication comprises a security parameter implicitly indicating that the non-access stratum key has been changed. The security parameter may comprise one of a nonce, timestamp, and freshness parameter.

Some embodiments of the method 350 further comprise sending, to the target AMF 40, a key derivation parameter used to derive the non-access stratum key. The key derivation parameter may comprise one of a nonce, timestamp, and freshness parameter.

Some embodiments of the method 350 further comprise sending the key derivation parameter to the UE 70.

Some embodiments of the method 350 further comprise receiving the key derivation parameter from the AMF 40 in the transparent container; and sending the key derivation parameter to the UE 70 in the transparent container.

In some embodiments of the method 350, generating the new non-access stratum key comprises generating the new non-access stratum key from a previous non-access stratum key.

In some embodiments of the method 350, generating the new non-access stratum key comprises generating a key derivation parameter; and generating the new non-access stratum key from a previous non-access stratum key and the key derivation parameter.

Some embodiments of the method 350 further comprise selecting the target AMF 40; and wherein generating a new non-access stratum key is performed depending on the selection of the target AMF 40.

In some embodiments of the method 350, generating the new non-access stratum key comprises generating two or more non-access stratum keys, each for different target AMF 40s. The two or more non-access stratum keys can be generated using different key derivation parameters.

Some embodiments of the method 350 further comprise sending one or more security parameters to the target AMF 40. The one or more security parameters may, in some instances, include UE 70 capability information. In some embodiments, the non-access stratum key and the one or more security parameters are transmitted to the target AMF 40 in a forward relocation message.

Some embodiments of the method 350 further comprise receiving, from the target AMF 40, a security algorithm parameter indicating at least one security algorithm; and forwarding the security algorithm parameter to the UE 70. The security algorithm parameter may be received from the target AMF 40 in a forward relocation response message. Some embodiments of the method 350 further comprise forwarding the security algorithm parameter to the UE 70 in the second handover message.

In some embodiments of the method 350, the first handover message comprises a handover required message indicating a need for a handover of the UE 70.

In some embodiments of the method 350, the new non-access stratum key is sent to the target AMF 40 in a forward relocation request message.

In some embodiments of the method 350, the non-access stratum key comprises a core network key (KCN).

Figure 15:
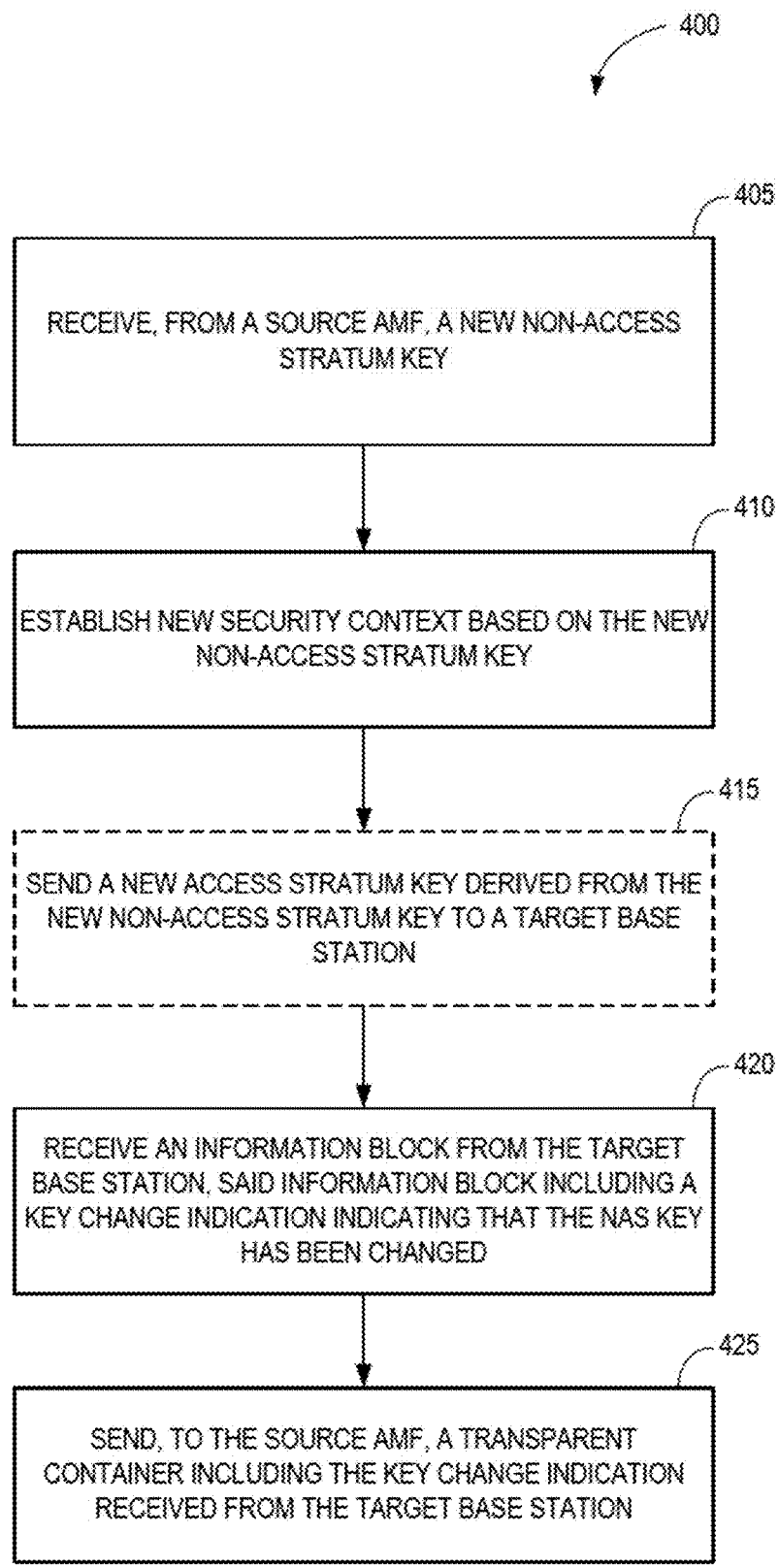
FIG. 15 illustrates another method implemented by a target AMF during a handover.

FIG. 15 illustrates an exemplary method 400 implemented during a handover by a target AMF 40 in a core network 30 of a wireless communication network 10. The target AMF 40 receives, from the source AMF 40, a new non-access stratum key (block 405). The target AMF establishes a new security context based on the new non-access stratum key (block 410). The new security context may include a new access stratum key derived from the new non-access stratum key. Where a new access stratum key is derived, the target AMF 40 optionally sends the new access stratum key to a target base station 25 (block 415). In one embodiment, the new access stratum key is sent in a handover request message. The target AMF also receives an information block including a key change indication from the target base station 25 (block 420). The information block may be sent, for example, in an RRC transparent container. In one embodiment, the information block further includes a handover command generated by the target base station 25 and/or a freshness parameter for deriving the new non-access stratum key. The target AMF 40 sends, to the source AMF 40, a transparent container including the handover command received from the target base station 25 (block 425). In some embodiments, the handover command in the transparent container includes a key change indication and/or key derivation parameter. In some embodiments, the target AMF 40 further receives a key change indication and/or key change derivation parameter (e.g., freshness parameter) from the target base station 25 and forwards the key derivation parameter to the source AMF in the transparent container along with the handover command.

Some embodiments of the method 400 further comprise receiving one or more security parameters from the source AMF 40. The one or more security parameters may include UE 70 capability information. In some embodiments, the security parameters is received with the new non-access stratum key.

In some embodiments of the method 400, establishing the new security context comprises selecting one or more security algorithms. The security algorithms may be selected based on the UE 70 capability information.

Some embodiments of the method 400 further comprise sending to the source AMF 40, a security algorithm parameter indicating at least one security algorithm for the new security context. The security algorithm parameter may be sent to the source AMF 40 in a forward relocation response message.

In some embodiments of the method 400, the new non-access stratum key is received from the source AMF 40 in a forward relocation request message.

In some embodiments of the method 400, the new access stratum key is sent to the target base station 25 in a handover request.

In some embodiments of the method 400, the non-access stratum key comprises a core network key (Kcn).

Some embodiments of the method 400 further comprise receiving the key change indication from the target base station 25 in the transparent container; and sending the key change indication to the source target AMF 40 in the transparent container.

In some embodiments of the method 400, the key change indication comprises a key change indicator flag set to a value indicating that the non-access stratum key has been changed.

In some embodiments of the method 400, the key change indication comprises a security parameter implicitly indicating that the non-access stratum key has been changed. The security parameter may comprise one of a nonce, timestamp, and freshness parameter.

Some embodiments of the method 400 sending, to the target base station 25, a key derivation parameter used to derive the non-access stratum key. In some embodiments, the key derivation parameter is received from the target base station 25 in the transparent container. The key derivation parameter may comprises one of a nonce, timestamp, and freshness parameter.

Figure 16:
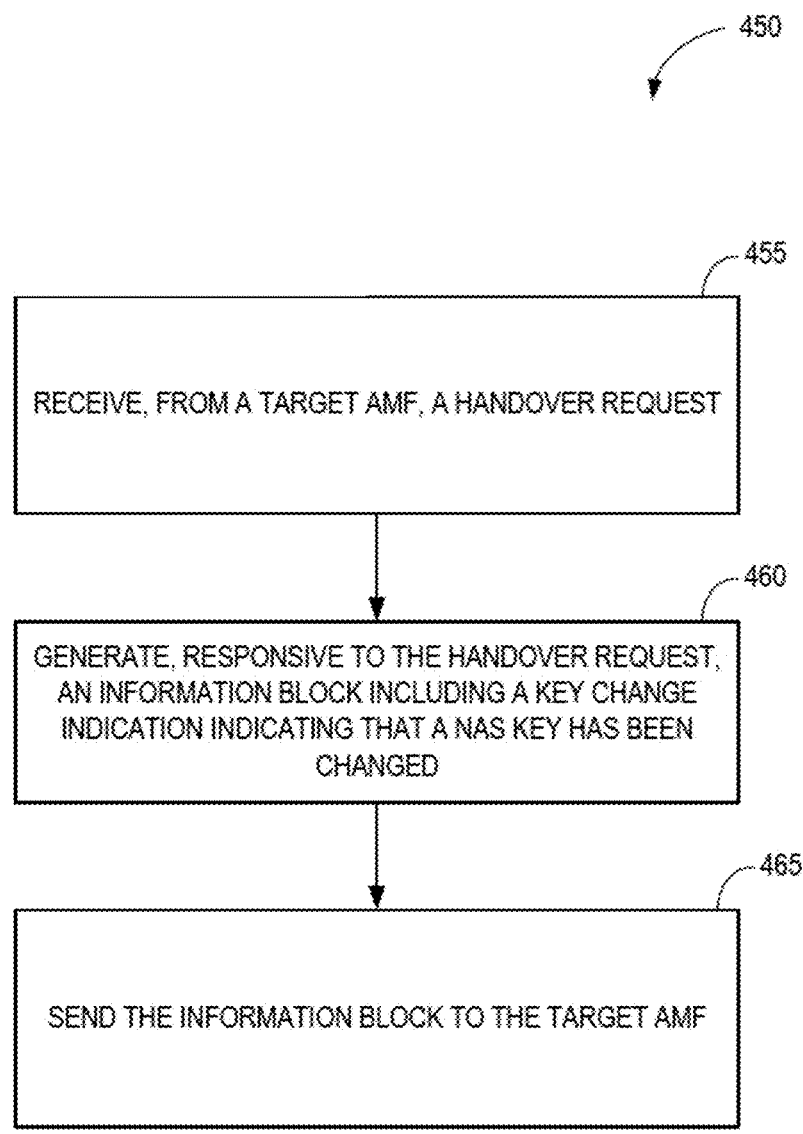
FIG. 16 illustrates a method implemented by a target base station during a handover.

FIG. 16 illustrates an exemplary method 450 implemented during a handover by a target base station 25 a wireless communication network 10. The target base station 25 receives, from a target AMF 40, a handover request indicating a need for a handover (block 455). Responsive to the handover request, the target base station 25 generates an information block including a key change indication indicating that a NAS key has been changed (block 460). The information block, in one example, comprises an RRC transparent container. The key change indication indicates that a NAS key has been changed. The target base station 25 sends the information block with the key change indication to a target AMF 40 for forwarding to the UE 70 (block 465). In some embodiments, the information block may further comprise a handover command generated by the target base station and/or a key derivation parameter used to derive the new NAS key.

Some embodiments of the method 450 further comprise receiving the key change indication from the target AMF 40 in the handover request.

In some embodiments of the method 450, the key change indication comprises a key change indicator flag set to a value indicating that the non-access stratum key has been changed.

In some embodiments of the method 450, the key change indication comprises a security parameter implicitly indicating that the non-access stratum key has been changed. The security parameter may comprise one of a nonce, timestamp, and freshness parameter.

Some embodiments of the method 450 further comprise receiving a key derivation parameter used to drive the new non-access stratum key from the target AMF 40 in the handover request, and sending the key derivation parameter to the target AMF 40 in the information block. The key derivation parameter may comprise one of a nonce, timestamp, and freshness parameter.

Figure 17:
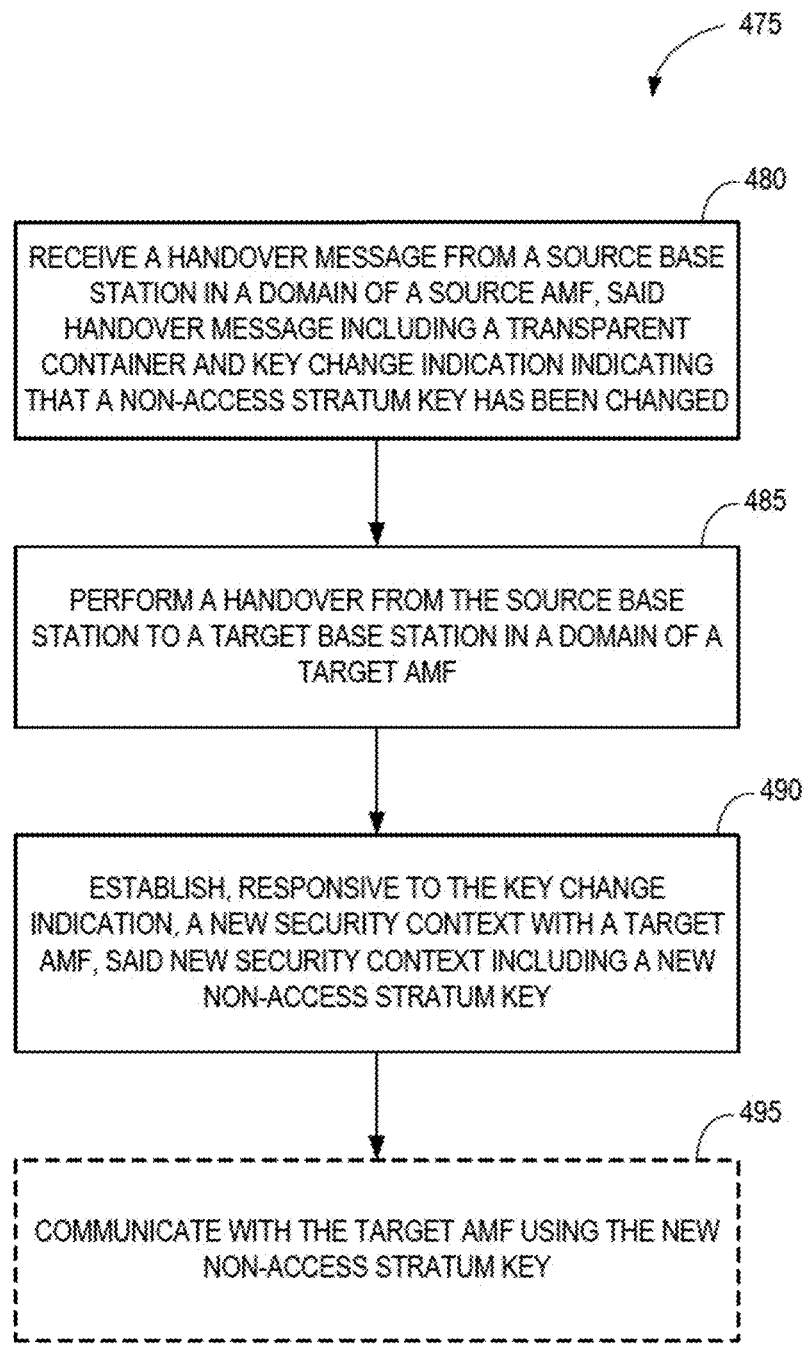
FIG. 17 illustrates a method implemented by a UE during a handover.

FIG. 17 illustrates an exemplary method 475 implemented by a UE 70 in a wireless communication network 10 during a handover. The UE 70 receives, from a from a source base station 25 in the domain of a source AMF 40 of the wireless communication network 10, a handover message including a transparent container and key change indication (block 480). The key change indication indicates to the UE 70 that a non-access stratum key has been changed. In some embodiments, the transparent container further includes a handover command generated by a target base station 25 and/or a key derivation parameter (e.g., freshness parameter used to derive the new NAS key. The UE 70 performs a handover from the source base station 25 to a target base station 25 in a domain of a target AMF 40 (block 485). The UE 70 establishes, responsive to the key change indication, a new security context with the target AMF 40 (block 490). The new security context includes a new non-access stratum key. The UE 70 may optionally communicate with the target AMF 40 using the new non-access stratum key (block 495).

In some embodiments of the method 475, the key change indication comprises a key change indicator flag set to a value indicating that the non-access stratum key has been changed.

In some embodiments of the method 475, the key change indication comprises a security parameter implicitly indicating that the non-access stratum key has been changed. The security parameter may comprise one of a nonce, timestamp, and freshness parameter.

Some embodiments of the method 475 further comprise receiving the key change indication in the transparent container.

Some embodiments of the method 475 further comprise receiving a key derivation parameter from the source base station 25, and generating the new non-access stratum key using the key derivation parameter. The key derivation parameter may comprise one of a nonce, timestamp, and freshness parameter. In some embodiments, the key derivation parameter is received with the key change indication in the transparent container. In some embodiments, the key derivation parameter serves as an implicit key change indication.

Some embodiments of the method 475 further comprise generating a new access stratum key from the new non-access stratum key, and communicating with a target base station 25 using the new access stratum key.

Some embodiments of the method 475 further comprise receiving a security algorithm parameter from the source base station 25 identifying one or more security algorithms used in the new security context. The security algorithm parameter may be received in the handover message along with the key change indication.

In some embodiments of the method 475, the non-access stratum key comprises a core network key (Kcn).

Figure 18:
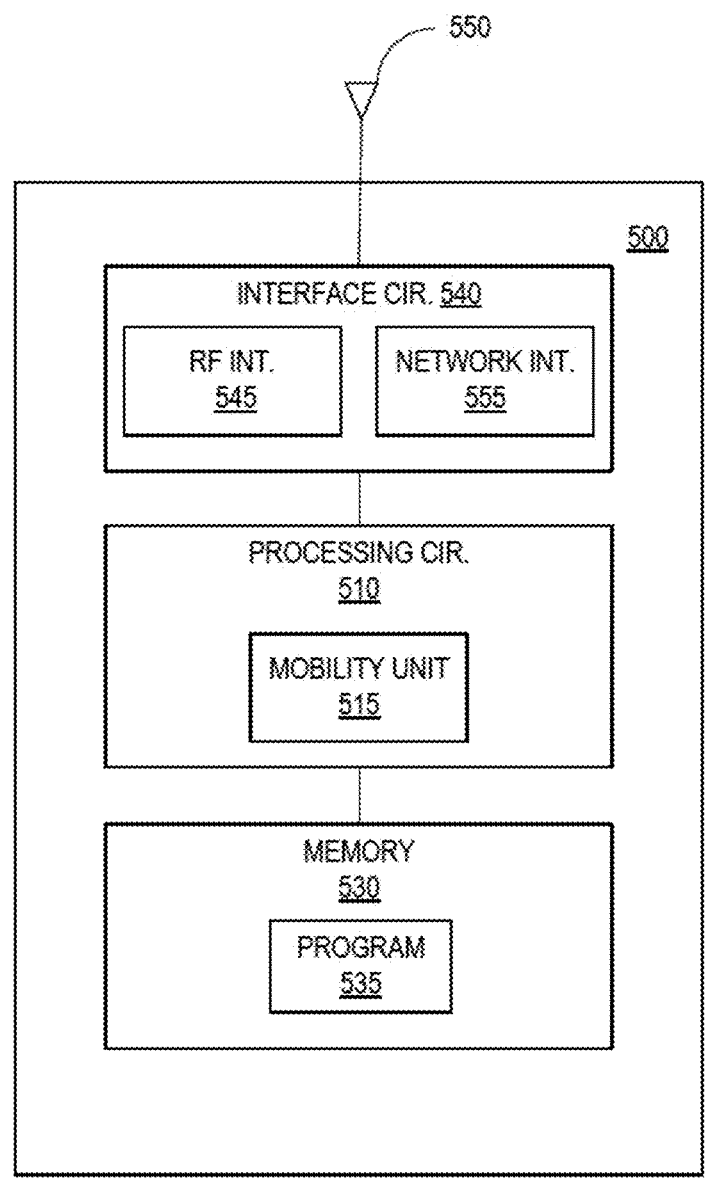
FIG. 18 illustrates an exemplary base station configured to implement the security context handling procedures as herein described.

FIG. 18 illustrates the main functional components of base station 500 configured to implement the security context handling methods as herein described. The base station 500 comprises a processing circuit 510, a memory 530, and an interface circuit 540.

The interface circuit 540 includes a radio frequency (RF) interface circuit 545 coupled to one or more antennas 550. The RF interface circuit 545 comprises the radio frequency (RF) components needed for communicating with the UEs 70 over a wireless communication channel. Typically, the RF components include a transmitter and receiver adapted for communications according to the 5G standards or other Radio Access Technology (RAT). The interface circuit 540 further includes a network interface circuit 555 for communicating with core network nodes in the wireless communication network 10.

The processing circuit 510 processes the signals transmitted to or received by the base station 500. Such processing includes coding and modulation of transmitted signals, and the demodulation and decoding of received signals. The processing circuit 510 may comprise one or more microprocessors, hardware, firmware, or a combination thereof. The processing circuit 510 includes a mobility unit 515 for performing handover-related functions. The mobility unit 515 comprises the processing circuitry dedicated to mobility-related functions. The mobility unit 515 is configured to perform any of the methods and procedures as herein described, including the methods shown in FIGS. 2, 5-9, 13 and 16.

Memory 530 comprises both volatile and non-volatile memory for storing computer program code and data needed by the processing circuit 510 for operation. Memory 530 may comprise any tangible, non-transitory computer-readable storage medium for storing data including electronic, magnetic, optical, electromagnetic, or semiconductor data storage. Memory 530 stores a computer program 535 comprising executable instructions that configure the processing circuit 510 to implement the methods and procedures described herein including method 100 according to FIGS. 2 and 6-8. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 535 for configuring the processing circuit 510 as herein described may be stored in a removable memory, such as a portable compact disc, portable digital video disc, or other removable media. The computer program 535 may also be embodied in a carrier such as an electronic signal, optical signal, radio signal, or computer readable storage medium.

Figure 19:
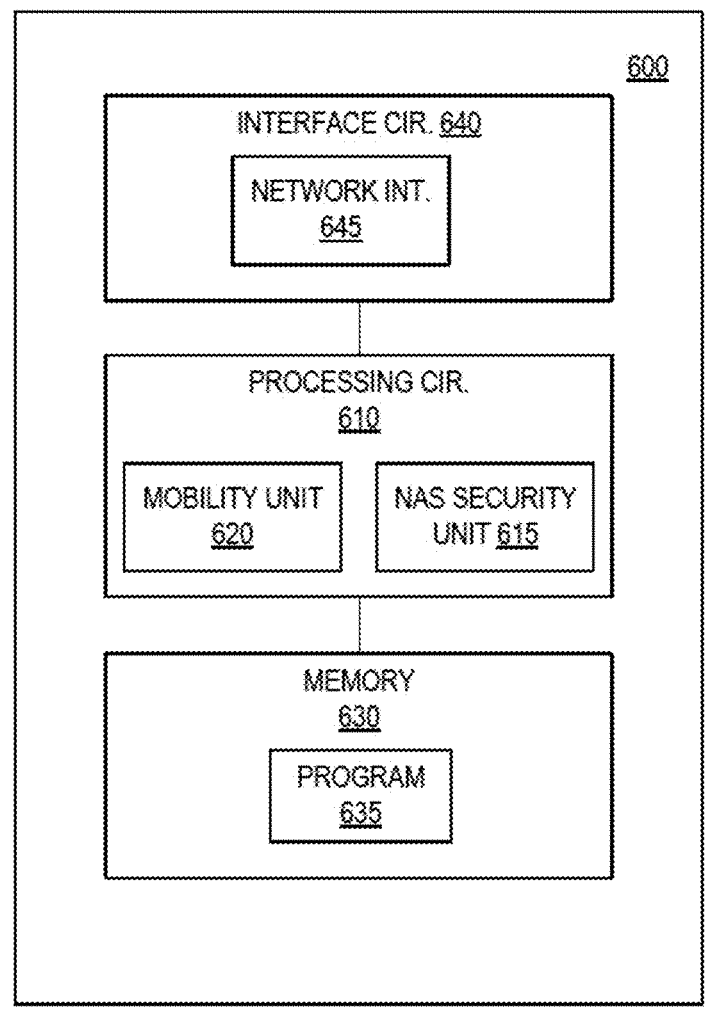
FIG. 19 illustrates an exemplary core network node configured to implement the security context handling procedures as herein described.

FIG. 19 illustrates the main functional components of a core network node 600 in the wireless communication network 10 configured to implement the security context handling procedure as herein described. The core network node 600 may be used to implement core network functions, such as the source AMF 40 and target AMF 40 as herein described. Those skilled in the art will appreciate that a core network function, such as the AMF 40, may be implemented by a single core network node, or may be distributed among two or more core network nodes.

The core network node 600 comprises a processing circuit 610, a memory 630, and an interface circuit 640. The interface circuit 640 includes a network interface circuit 645 to enable communication with other core network nodes and with base stations 25 in the RAN.

The processing circuit 610 controls the operation of the core network node 600. The processing circuit 610 may comprise one or more microprocessors, hardware, firmware, or a combination thereof. The processing circuit 610 may include a NAS security unit 615 to handle NAS-related security functions and a mobility management unit 620 to handle AMF 40s. Generally, the NAS security unit 615 is responsible for deriving security keys, establishing a security context, and other related security functions. The mobility management unit 620 is responsible for handling AMF 40s and related signaling. As described previously, the NAS security unit 615 may provide the mobility management 620 unit with information, such as NAS keys, key derivation parameters, and other security parameters to be sent to the UE 70. In some embodiments, the NAS security unit 615 and the mobility management unit 620 may reside in the same core network node. In other embodiments, they may reside in different core network nodes. The NAS security unit 615 and the mobility management unit 620 can be configured to perform any of the methods and procedures as herein described, including the methods shown in FIGS. 2, 5-8, 10, 11, 14 and 15.

Memory 630 comprises both volatile and non-volatile memory for storing computer program code and data needed by the processing circuit 610 for operation. Memory 630 may comprise any tangible, non-transitory computer-readable storage medium for storing data including electronic, magnetic, optical, electromagnetic, or semiconductor data storage. Memory 630 stores a computer program 635 comprising executable instructions that configure the processing circuit 610 to implement the methods and procedures described herein including methods according to FIGS. 2-14. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, a computer program 635 for configuring the processing circuit 610 as herein described may be stored in a removable memory, such as a portable compact disc, portable digital video disc, or other removable media. The computer program 635 may also be embodied in a carrier such as an electronic signal, optical signal, radio signal, or computer readable storage medium.

Figure 20:
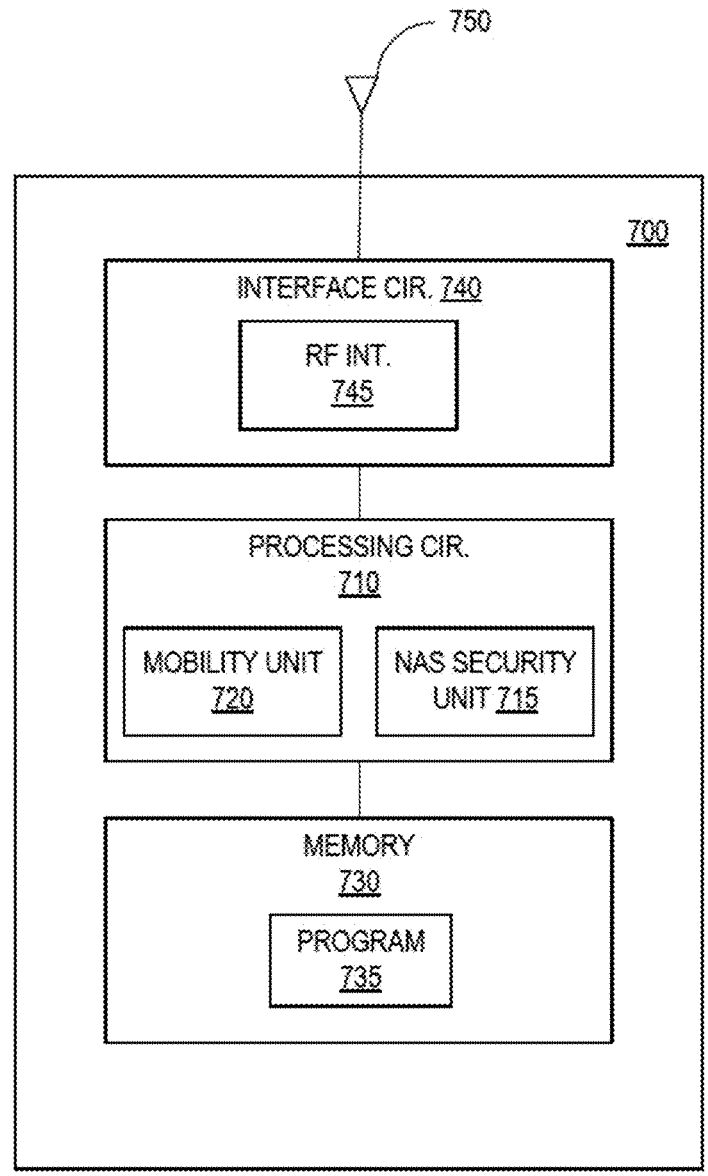
FIG. 20 illustrates an exemplary user equipment configured to implement the security context handling procedures as herein described.

FIG. 20 illustrates the main functional components of UE 700 configured to implement the security context handling methods as herein described. The UE 700 comprises a processing circuit 710, a memory 730, and an interface circuit 740.

The interface circuit 740 includes a radio frequency (RF) interface circuit 745 coupled to one or more antennas 750. The RF interface circuit 745 comprises the radio frequency (RF) components needed for communicating with the UEs 70 over a wireless communication channel. Typically, the RF components include a transmitter and receiver adapted for communications according to the 5G standards or other Radio Access Technology (RAT).

The processing circuit 710 processes the signals transmitted to or received by the UE 700. Such processing includes coding and modulation of transmitted signals, and the demodulation and decoding of received signals. The processing circuit 710 may comprise one or more microprocessors, hardware, firmware, or a combination thereof. The processing circuit 710 may include a NAS security unit 715 to handle NAS-related security functions and a mobility management unit 720 to handle AMF 40s. Generally, the NAS security unit 715 is responsible for deriving security keys, establishing a security context, and other security functions as herein described. The mobility management unit 720 is responsible for handling AMF 40s and related signaling. In one exemplary embodiment, the NAS security unit 715 and the mobility management unit 720 are configured to perform the methods and procedures as herein described, including the methods shown in FIGS. 2, 5-8, 12 and 17.

Memory 730 comprises both volatile and non-volatile memory for storing computer program code and data needed by the processing circuit 710 for operation. Memory 730 may comprise any tangible, non-transitory computer-readable storage medium for storing data including electronic, magnetic, optical, electromagnetic, or semiconductor data storage. Memory 730 stores a computer program 735 comprising executable instructions that configure the processing circuit 710 to implement the methods and procedures described herein including method 100 according to FIGS. 2 and 6-8. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 735 for configuring the processing circuit 710 as herein described may be stored in a removable memory, such as a portable compact disc, portable digital video disc, or other removable media. The computer program 735 may also be embodied in a carrier such as an electronic signal, optical signal, radio signal, or computer readable storage medium.

Figure 30:
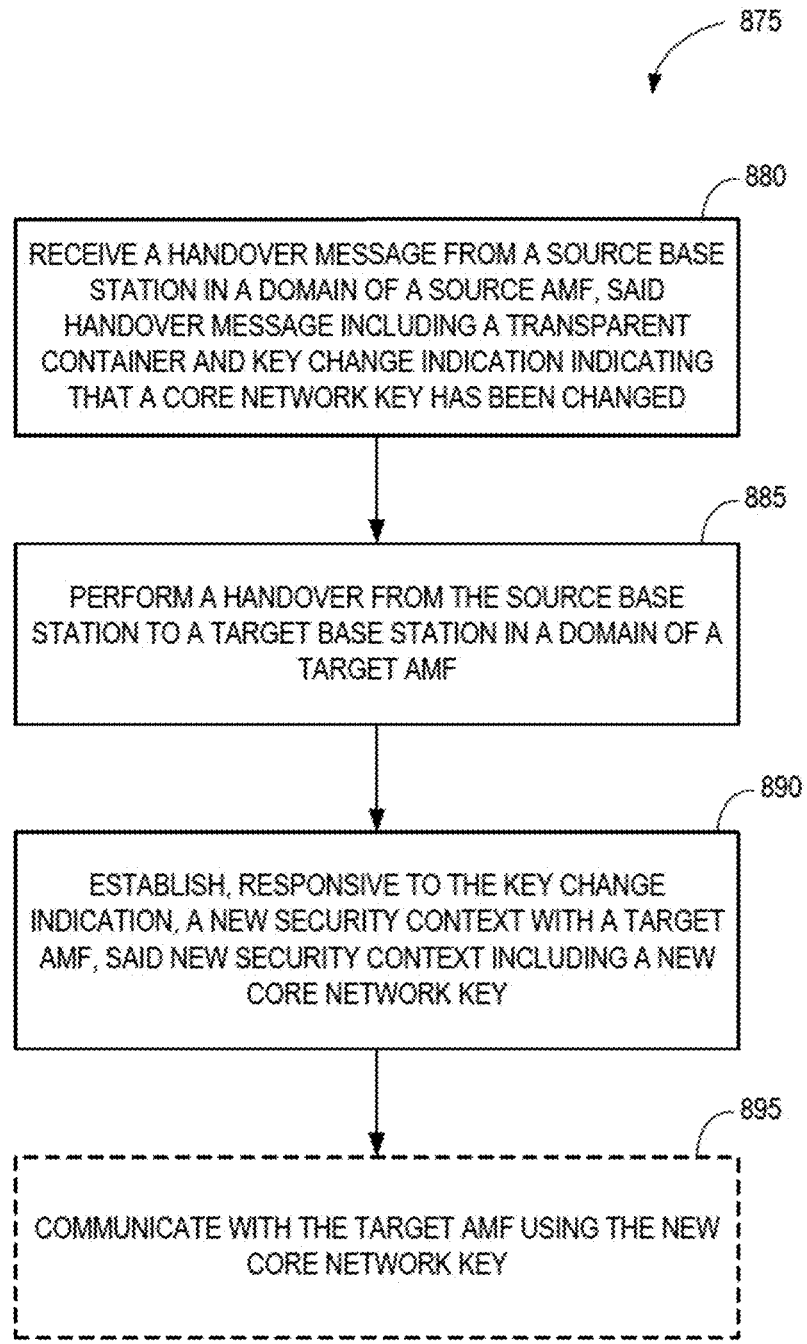
FIG. 30 illustrates a method implemented by a UE during a handover.

FIG. 30 illustrates an exemplary method 875 implemented by a UE 70 in a wireless communication network 10 during a handover. The UE 70 receives, from a source base station 25 in the domain of a source AMF 40 of the wireless communication network 10, a handover message including a transparent container and key change indication (block 880). The key change indication indicates to the UE 70 that a core network key has been changed. In some embodiments, the transparent container further includes a handover command generated by a target base station 25 and/or a key derivation parameter (e.g., freshness parameter used to derive the new core network key. The UE 70 performs a handover from the source base station 25 to a target base station 25 in a domain of a target AMF 40 (block 885). The UE 70 establishes, responsive to the key change indication, a new security context with the target AMF 40 (block 890). The new security context includes a new core network key. The UE 70 may optionally communicate with the target AMF 40 using the new core network key (block 895).

In some embodiments of the method 875, the key change indication comprises a key change indicator flag set to a value indicating that the core network key has been changed.

In some embodiments of the method 875, the key change indication comprises a security parameter implicitly indicating that the core network key has been changed. The security parameter may comprise one of a nonce, timestamp, and freshness parameter.

Some embodiments of the method 875 further comprise receiving the key change indication in the transparent container.

Some embodiments of the method 875 further comprise receiving a key derivation parameter from the source base station 25, and generating the new core network key using the key derivation parameter. The key derivation parameter may comprise one of a nonce, timestamp, and freshness parameter. In some embodiments, the key derivation parameter is received with the key change indication in the transparent container. In some embodiments, the key derivation parameter serves as an implicit key change indication.

Some embodiments of the method 875 further comprise generating a new access stratum key from the new core network key, and communicating with a target base station 25 using the new access stratum key.

Some embodiments of the method 875 further comprise receiving a security algorithm parameter from the source base station 25 identifying one or more security algorithms used in the new security context. The security algorithm parameter may be received in the handover message along with the key change indication.

Figure 31:
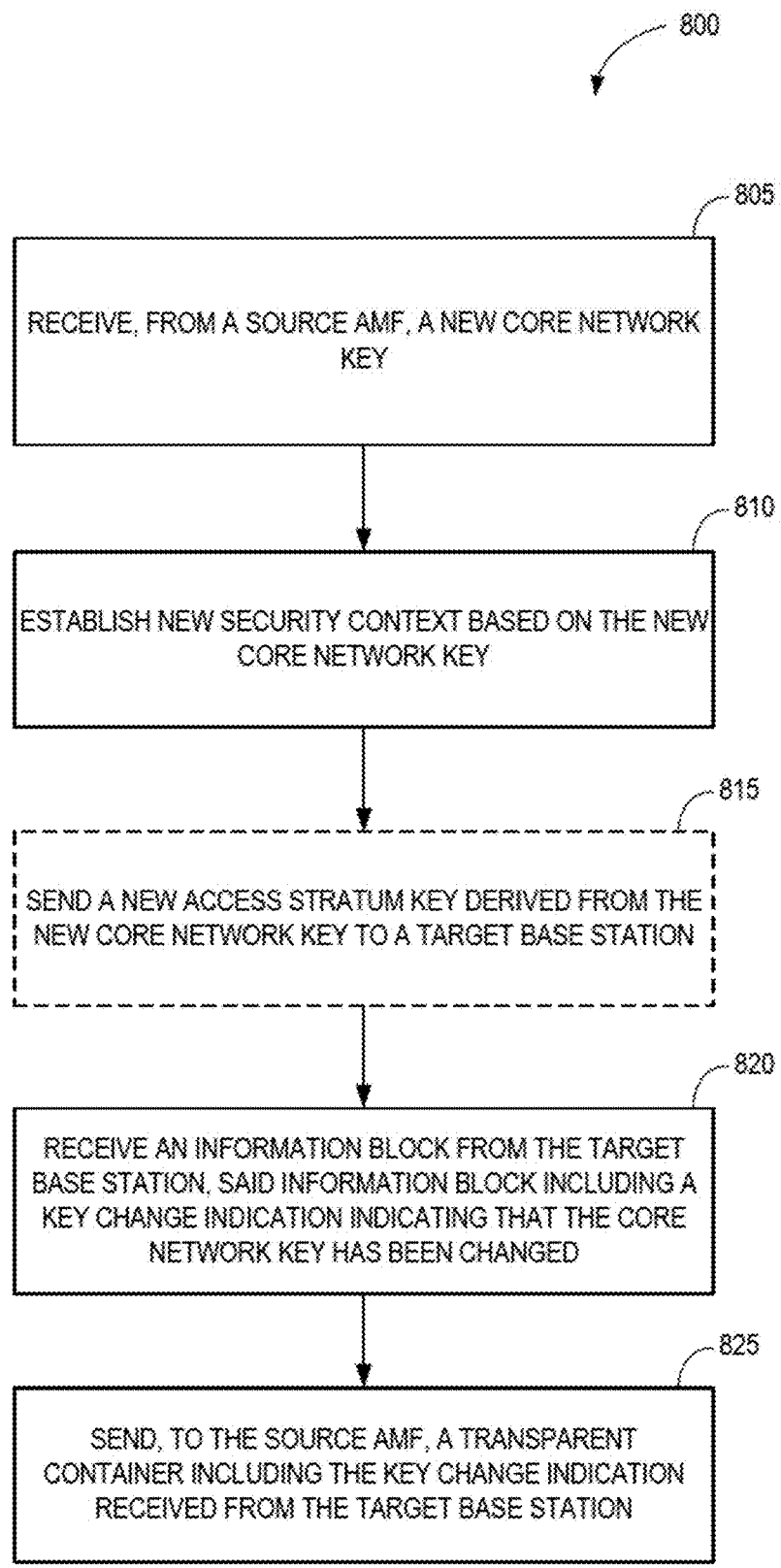
FIG. 31 illustrates another method implemented by a target AMF during a handover.

FIG. 31 illustrates an exemplary method 800 implemented during a handover by a target AMF 40 in a core network 30 of a wireless communication network 10. The target AMF 40 receives, from the source AMF 40, a new core network key (block 805). The target AMF establishes a new security context with the new core network key (block 810). The new security context may include a new access stratum key derived from the new core network key. Where a new access stratum key is derived, the target AMF 40 optionally sends the new access stratum key to a target base station 25 (block 815). In one embodiment, the new access stratum key is sent in a handover request message. The target AMF also receives an information block including a key change indication from the target base station 25 (block 820). The information block may be sent, for example, in an RRC transparent container. In one embodiment, the information block further includes a handover command generated by the target base station 25 and/or a freshness parameter for deriving the new core network key. The target AMF 40 sends, to the source AMF 40, a transparent container including the handover command received from the target base station 25 (block 825). In some embodiments, the handover command in the transparent container includes a key change indication and/or key derivation parameter. In some embodiments, the target AMF 40 further receives a key change indication and/or key change derivation parameter (e.g., freshness parameter) from the target base station 25 and forwards the key derivation parameter to the source AMF in the transparent container along with the handover command.

Some embodiments of the method 800 further comprise receiving one or more security parameters from the source AMF 40. The one or more security parameters may include UE 70 capability information. In some embodiments, the security parameters is received with the new core network key.

In some embodiments of the method 800, establishing the new security context comprises selecting one or more security algorithms. The security algorithms may be selected based on the UE 70 capability information.

Some embodiments of the method 800 further comprise sending to the source AMF 40, a security algorithm parameter indicating at least one security algorithm for the new security context. The security algorithm parameter may be sent to the source AMF 40 in a forward relocation response message.

In some embodiments of the method 800, the new core network key is received from the source AMF 40 in a forward relocation request message.

In some embodiments of the method 800, the new access stratum key is sent to the target base station 25 in a handover request.

Some embodiments of the method 800 further comprise receiving the key change indication from the target base station 25 in the transparent container; and sending the key change indication to the source target AMF 40 in the transparent container.

In some embodiments of the method 800, the key change indication comprises a key change indicator flag set to a value indicating that the core network key has been changed.

In some embodiments of the method 800, the key change indication comprises a security parameter implicitly indicating that the core network key has been changed. The security parameter may comprise one of a nonce, timestamp, and freshness parameter.

Some embodiments of the method 800 sending, to the target base station 25, a key derivation parameter used to derive the core network key. In some embodiments, the key derivation parameter is received from the target base station 25 in the transparent container. The key derivation parameter may comprise one of a nonce, timestamp, and freshness parameter.

ADDITIONAL EMBODIMENTS

Figure 21:
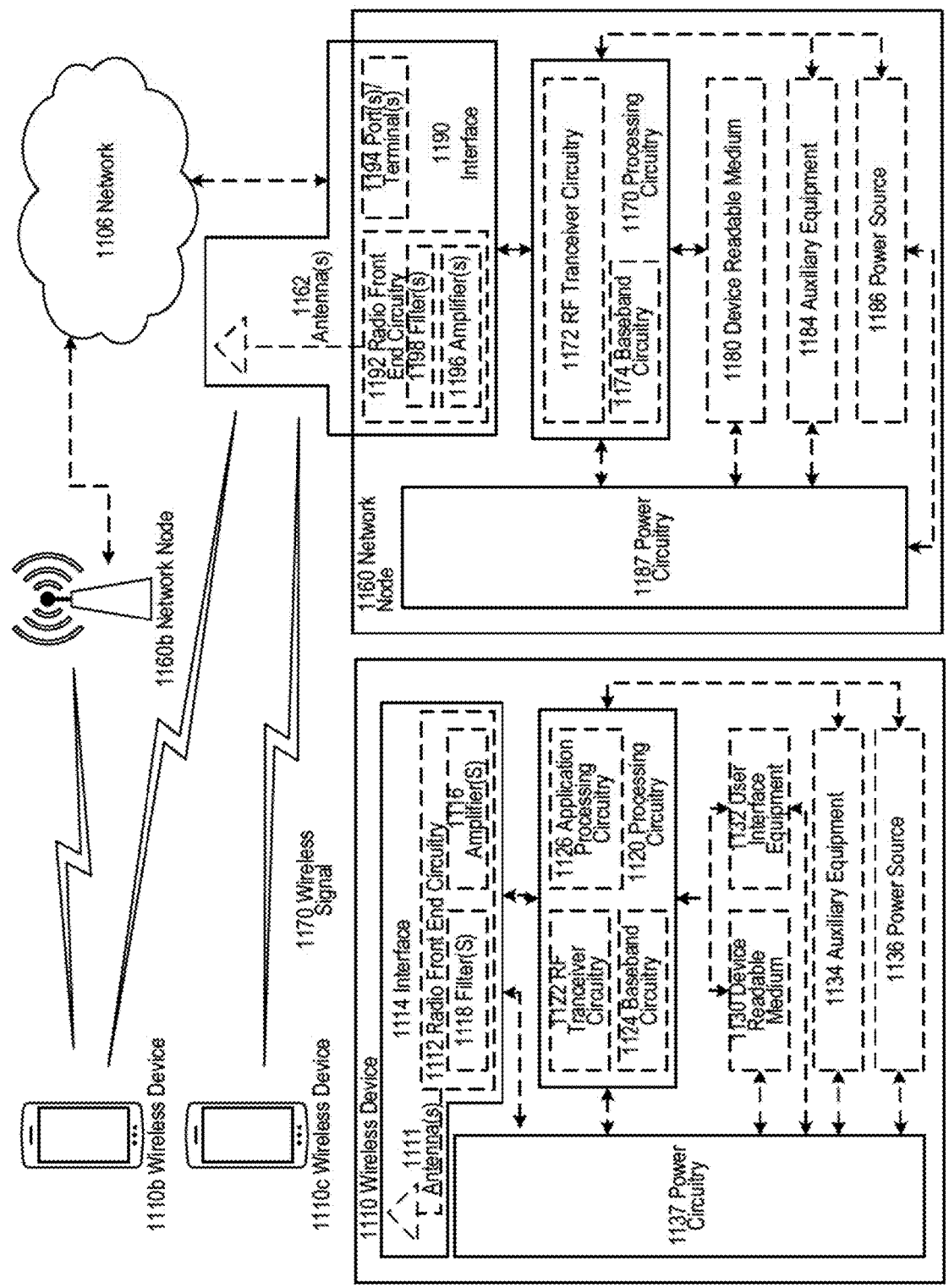
FIG. 21 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 21. For simplicity, the wireless network of FIG. 21 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 21, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 21 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 21 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1112 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 22:
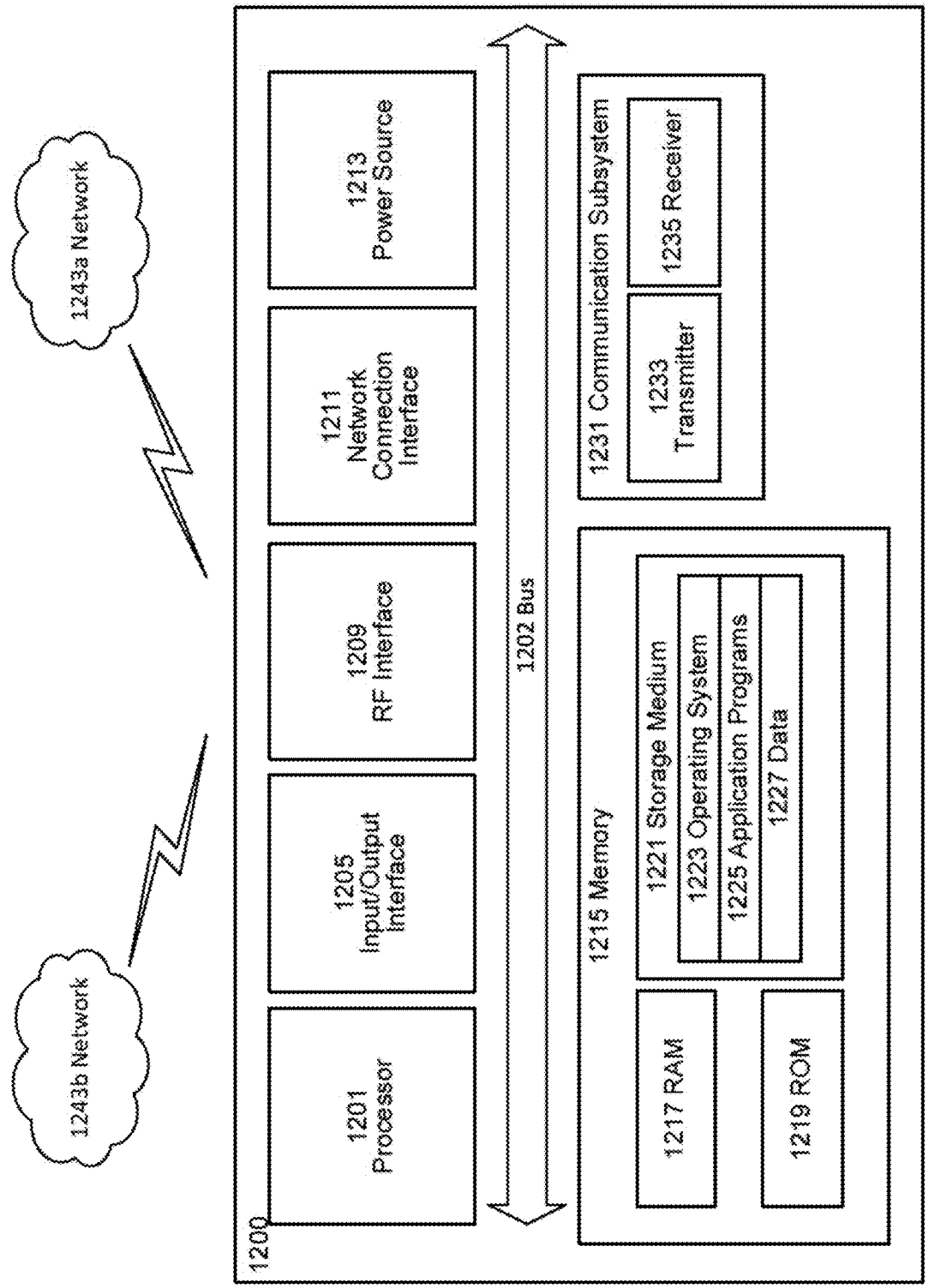
FIG. 22 illustrates an exemplary UE according to an embodiment.

FIG. 22 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 22, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 22 is a UE, the components discussed herein are equally applicable to a WD, and vice-versa.

In FIG. 22, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1213, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 22, or only a subset of the components. The level of integration between the components may vary from one UE to another UE. Further, certain UEs may contain multiple instances of a component, such as multiple processors, memories, transceivers, transmitters, receivers, etc.

In FIG. 22, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 22, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 22, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 23:
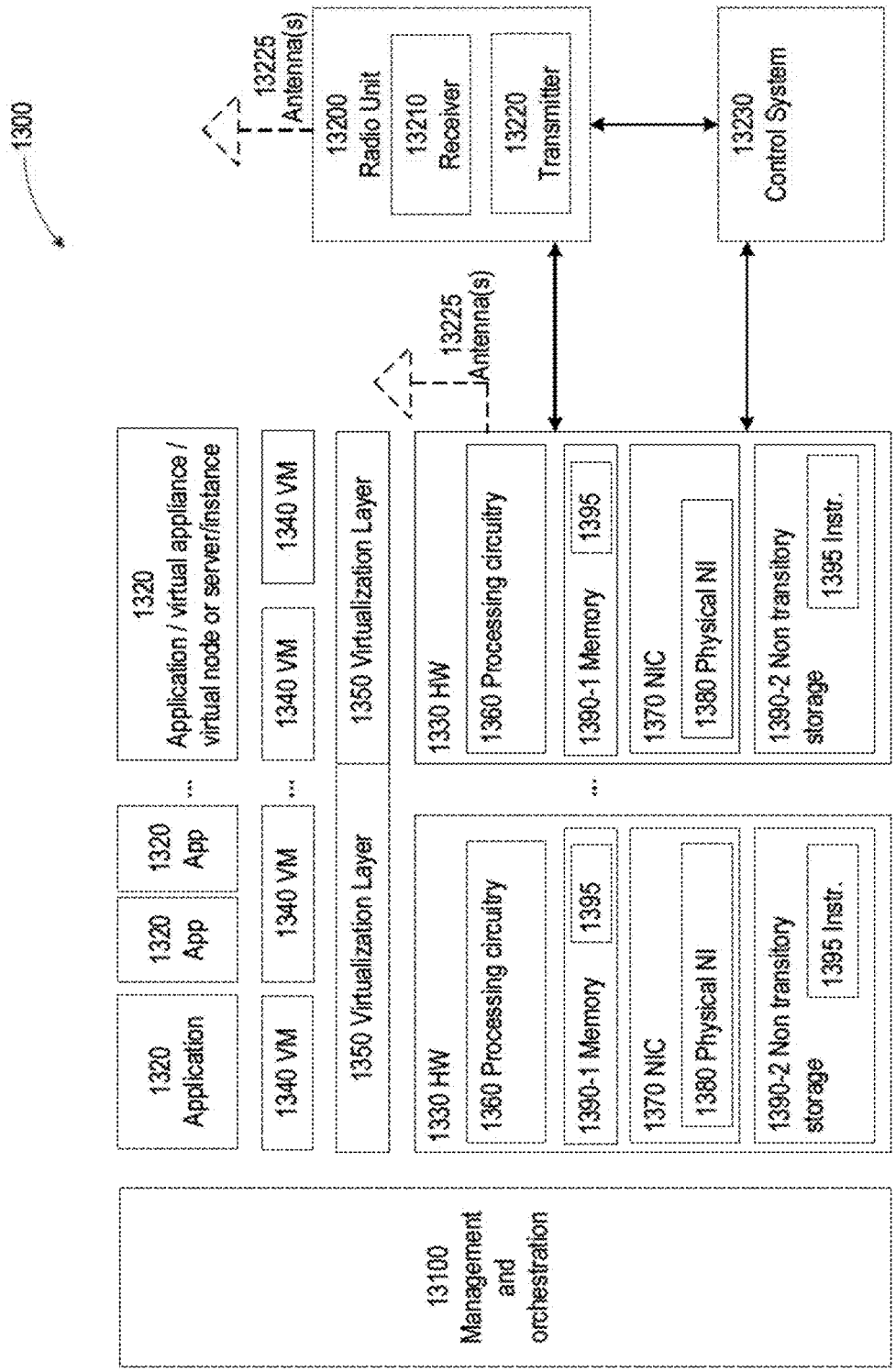
FIG. 23 illustrates an exemplary virtualization environment according to an embodiment.

FIG. 23 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 23, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 23.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 24:
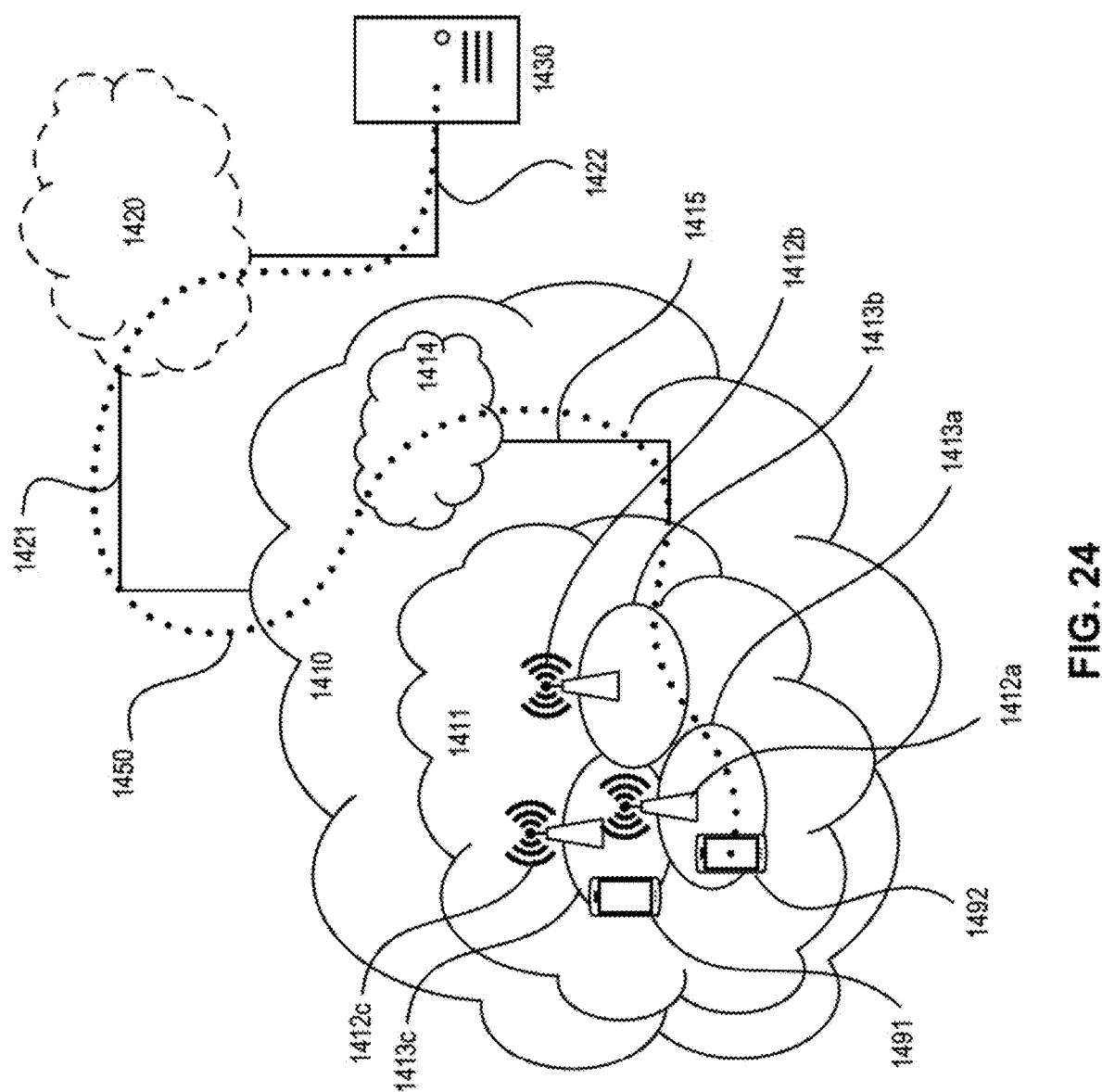
FIG. 24 illustrates an exemplary telecommunication network connected via an intermediate network to a host computer according to an embodiment.

FIG. 24 illustrates a telecommunication network connected via an intermediate network to a host computer in accordance with some embodiments. In particular, with reference to FIG. 24, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 24 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 25:
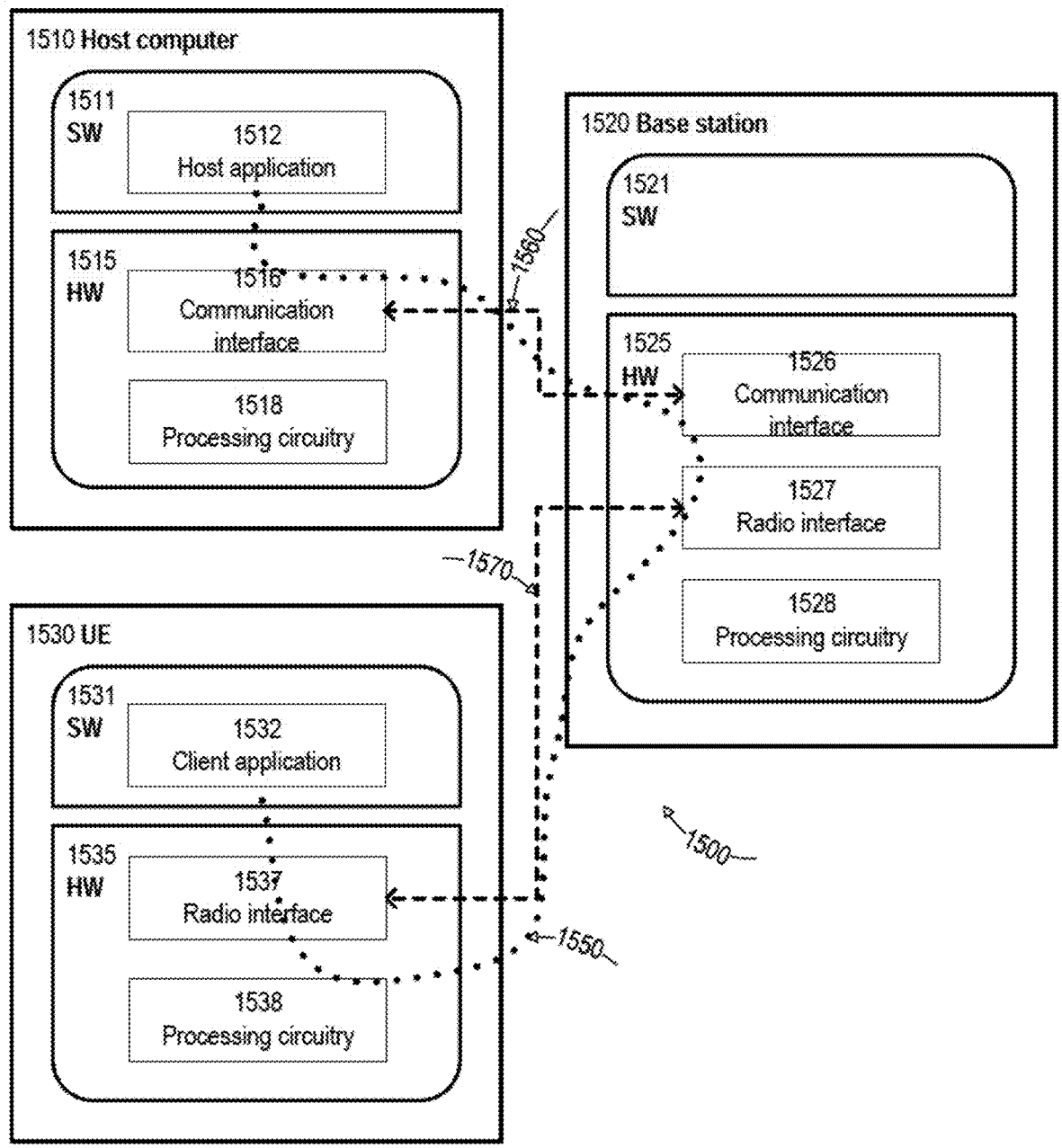
FIG. 25 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 25. FIG. 25 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 25) served by base station 1520. Communication interface 1526 may be configured to facilitate connection 1560 to host computer 1510. Connection 1560 may be direct or it may pass through a core network (not shown in FIG. 25) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 25 may be similar or identical to host computer 1430, one of base stations 1412a, 1412b, 1412c and one of UEs 1491, 1492 of FIG. 24, respectively. This is to say, the inner workings of these entities may be as shown in FIG. 25 and independently, the surrounding network topology may be that of FIG. 24.

In FIG. 25, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency of data transmissions and thereby provide benefits such as reduced waiting time, particularly for machine control applications.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 26:
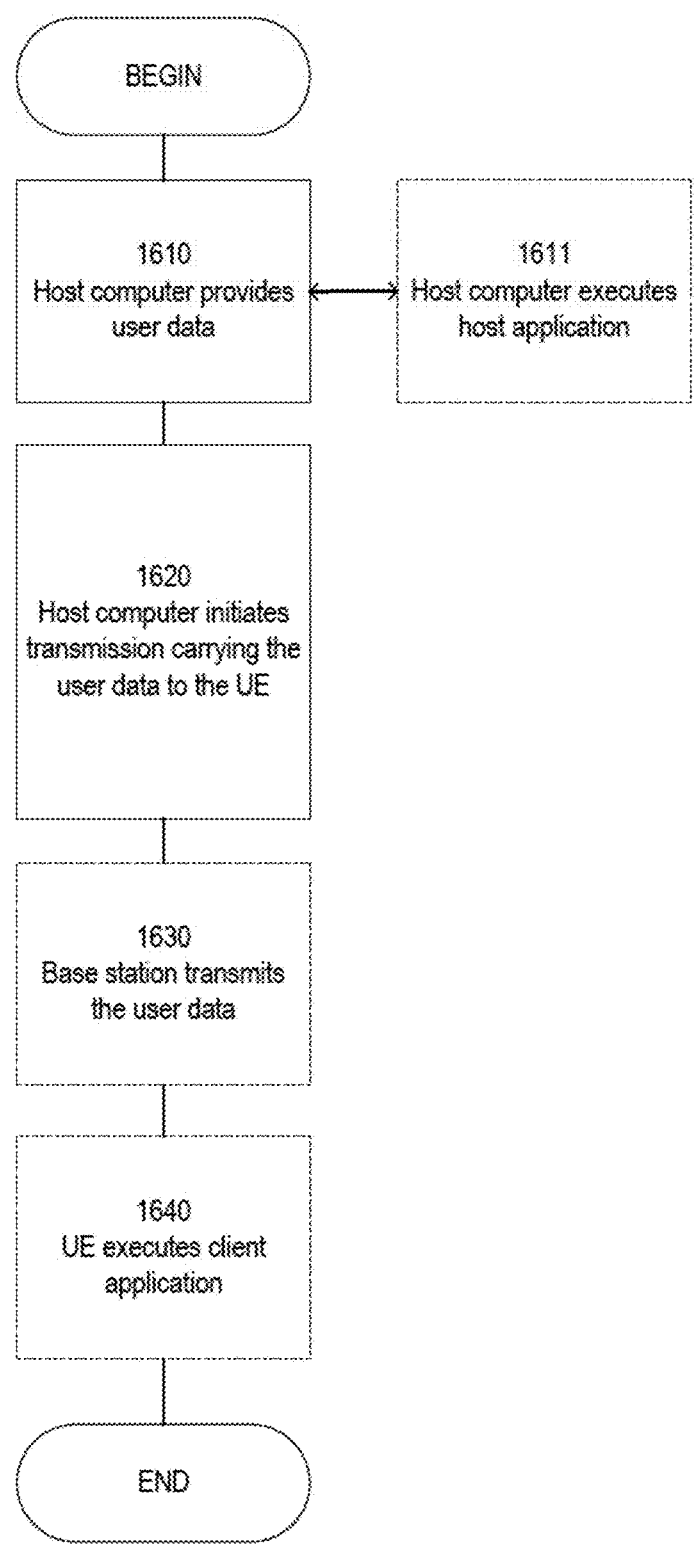
FIGS. 26-29 illustrate an exemplary methods implemented in a communication system, according to an embodiment.

FIG. 26 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 26 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 27:
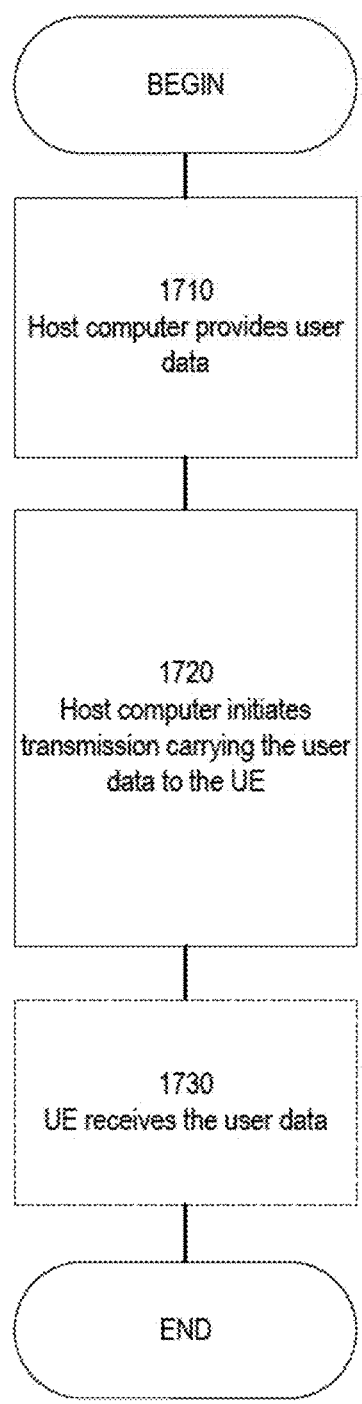

FIG. 27 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 27 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 28:
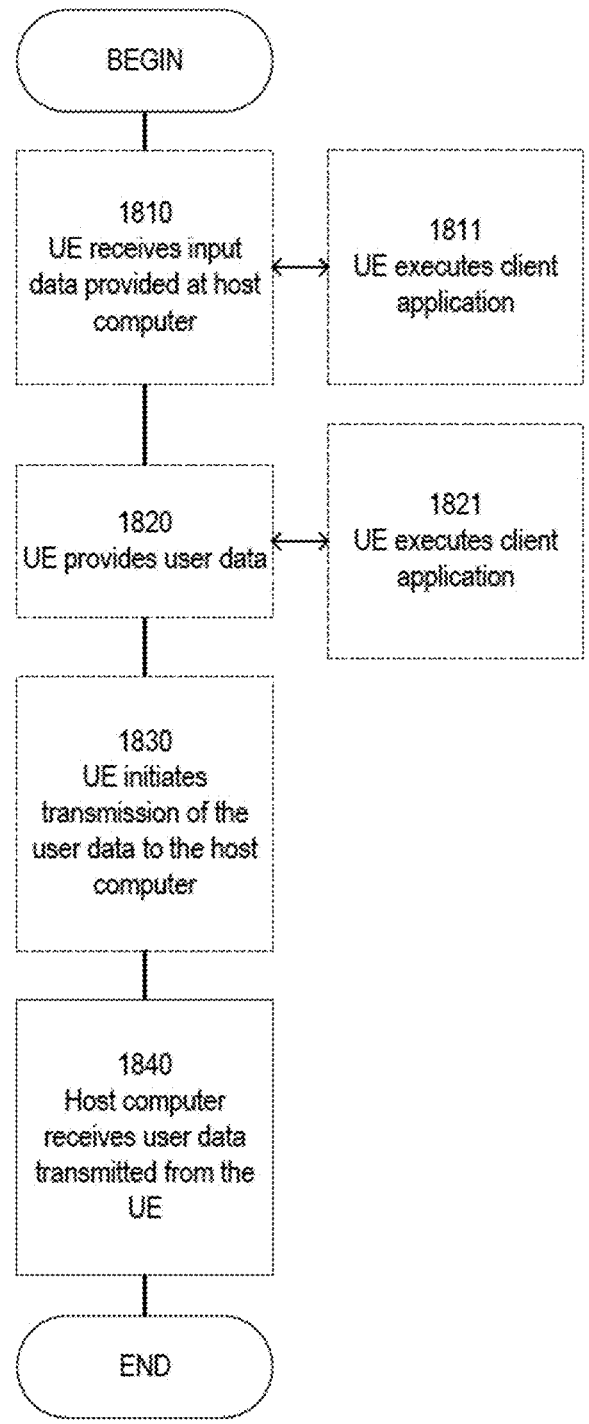

FIG. 28 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 28 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 29:
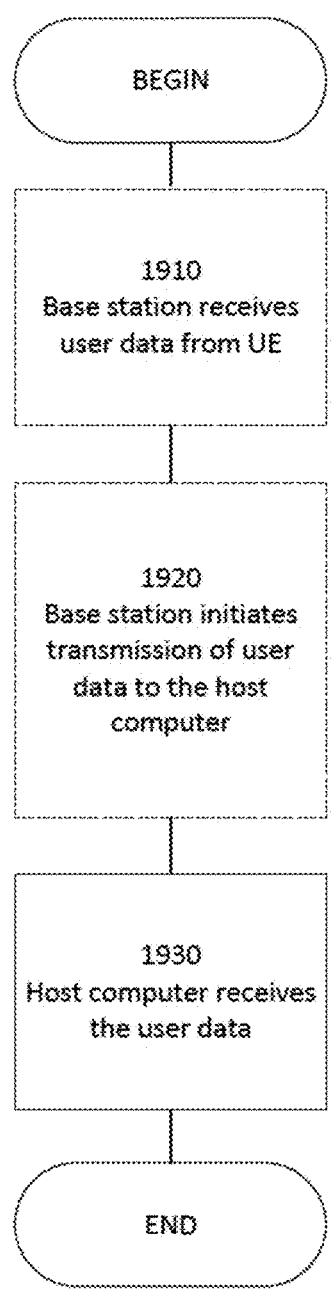

FIG. 29 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 29 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Other embodiments of the present disclosure are shown in Appendix A and B below.

What is claimed is:

1. A method for transferring a security context during a handover of a user equipment, the method implemented by one or more core network nodes in a core network of the wireless communication network, wherein the one or more core network nodes provide a 5G Access and Mobility Management Function, the method comprising:
    receiving, from a source 5G Access and Mobility Management Function, a new non-access stratum key generated by the source 5G Access and Mobility Management Function in response to the source 5G Access and Mobility Management Function having determined that an operator specific security policy is met;
    establishing a new security context including a new access stratum key derived from the new non-access stratum key;
    sending the new access stratum key to a target base station; and
    sending to the user equipment, via the source 5G Access and Mobility Management Function, a key change indicator flag set to a value indicating a change of the non-access stratum key.

2. The method of claim 1, further comprising receiving one or more security parameters from the source 5G Access and Mobility Management Function.

3. The method of claim 2, wherein the one or more security parameters include user equipment capability information.

4. The method of claim 2, further comprising receiving the security parameters with the new non-access stratum key.

5. The method of claim 1, wherein establishing the new security context comprises selecting one or more non-access stratum security algorithms to be used by the user equipment.

6. The method of claim 5, further comprising selecting at least one of the non-access stratum security algorithms based on the user equipment capability information.

7. The method of claim 5, further comprising sending to the source 5G Access and Mobility Management Function, a non-access stratum security algorithm parameter indicating at least one security algorithm for the new security context.

8. The method of claim 1, wherein the new non-access stratum key is received from the source 5G Access and Mobility Management Function in a forward relocation request message.

9. The method of claim 1, wherein the new access stratum key is sent to the target base station in a handover request.

10. The method of claim 7, wherein the security algorithm parameter is sent to the source 5G Access and Mobility Management Function in a forward relocation response message.

11. The method of claim 1, wherein the new non-access strum key comprises a core network key (Kcn).

12. The method of claim 1, wherein sending to the user equipment a key change indicator flag set to a value comprises sending the key change indicator flag to the user equipment via the source 5G Access and Mobility Management Function in a transparent container.

13. The method of claim 12, further comprising:
    receiving a handover command from the target base station; and
    sending the handover command to the user equipment in the transparent container.

14. The method of claim 13, wherein the handover command includes the key change indicator flag.

15. A core network node in a core network of a wireless communication network, the core network node providing a target 5G Access and Mobility Management Function for the wireless communication network, the core network node comprising:
    an interface circuit for communicating with a source 5G Access and Mobility Management Function in a core network of the wireless communication network and a target base station; and
    a processing circuit configured to:
        receive, from the source 5G Access and Mobility Management Function, a new non-access stratum key in response to the source 5G Access and Mobility Management Function having determined that an operator specific security policy is met;
        establish a new security context including a new access stratum key derived from the new non-access stratum key;
        send the new access stratum key to the target base station; and
        send, to the user equipment via the source 5G Access and Mobility Management Function, a key change indicator flag set to a value indicating a change of the non-access stratum key.

16. The core network node of claim 15, wherein the processing circuit is further configured to receive one or more security parameters from the source 5G Access and Mobility Management Function.

17. The core network node of claim 16, wherein the one or more security parameters include user equipment capability information.

18. The core network node of claim 16, wherein the processing circuit is further configured to receive the security parameters with the new non-access stratum key.

19. The core network node of claim 15, wherein the processing circuit is further configured to select one or more non-access stratum security algorithms for the new security context.

20. The core network node of embodiment 17, wherein the processing circuit is further configured to select at least one of the non-access stratum security algorithms based on the user equipment capability information.

21. The core network node of claim 17, wherein the processing circuit is further configured to send, to the source 5G Access and Mobility Management Function, a non-access stratum security algorithm parameter indicating at least one non-access stratum security algorithm for the new security context.

22. The core network node of claim 15, wherein the processing circuit is further configured to send the new access stratum key to the target base station in a handover request message.

23. The core network node of claim 15 wherein the new non-access stratum key comprises a core network key (Kcn).

24. The core network node of claim 15, wherein the processing circuit is further configured to send the key change indicator flag to the user equipment via the source 5G Access and Mobility Management Function in a transparent container.

25. The core network node of claim 24, wherein the processing circuit is further configured to:
  receive a handover command from the target base station; and
  send the handover command to the user equipment in the transparent container.

26. The core network node of claim 25, wherein the handover command includes the key change indicator flag.

* * * * *

UNITED STATES PATENT AND TRADEMARK OFFICE
CERTIFICATE OF CORRECTION

PATENT NO. : 11,388,592 B2
APPLICATION NO. : 16/714494
DATED : July 12, 2022
INVENTOR(S) : Ben Henda et al.

It is certified that error appears in the above-identified patent and that said Letters Patent is hereby corrected as shown below:

On the Title Page

On Page 2, in Item (56), under "OTHER PUBLICATIONS", in Column 2, Line 34, delete "allignment," and insert -- alignment, --, therefor.

On Page 2, in Item (56), under "OTHER PUBLICATIONS", in Column 2, Line 58, delete "Disco" and insert -- Cisco --, therefor.

On Page 2, in Item (56), under "OTHER PUBLICATIONS", in Column 2, Line 58, delete "Star0S" and insert -- StarOS --, therefor.

In the Drawings

In Fig. 9, Sheet 8 of 30, at Block "105", Line 3, delete "TO A INITIATE" and insert -- TO INITIATE --, therefor.

In Fig. 11, Sheet 10 of 30, at Block "205", Line 2, delete "KEY FROM A SOURCE AMF" and insert -- KEY --, therefor.

In Fig. 19, Sheet 18 of 30, for Tag "620", delete "MOBILITY UNIT" and insert -- MOBILITY MANAGEMENT UNIT --, therefor.

In Fig. 20, Sheet 19 of 30, for Tag "720", Line 1, delete "MOBILITY UNIT" and insert -- MOBILITY MANAGEMENT UNIT --, therefor.

In Fig. 21, Sheet 20 of 30, for Tag "1172", Line 1, delete "Tranceiver" and insert -- Transceiver --, therefor.

In Fig. 21, Sheet 20 of 30, for Tag "1174", Lines 1-2, delete "Baseband Circuitry" and insert -- Baseband Processing Circuitry --, therefor.

Signed and Sealed this
Fourth Day of April, 2023

Katherine Kelly Vidal
*Director of the United States Patent and Trademark Office*

CERTIFICATE OF CORRECTION (continued)
U.S. Pat. No. 11,388,592 B2

In Fig. 21, Sheet 20 of 30, for Tag "1116", Line 1, delete "Amplifier(S)" and insert -- Amplifier(s) --, therefor.

In Fig. 21, Sheet 20 of 30, delete "1170 Wireless Signal".

In Fig. 21, Sheet 20 of 30, for Tag "1118", Line 1, delete "Filter(S)" and insert -- Filter(s) --, therefor.

In Fig. 21, Sheet 20 of 30, for Tag "1122", Line 2, delete "Tranceiver" and insert -- Transceiver --, therefor.

In Fig. 21, Sheet 20 of 30, for Tag "1124", Lines 1-2, delete "Baseband Circuitry" and insert -- Baseband Processing Circuitry --, therefor.

In Fig. 22, Sheet 21 of 30, for Tag "1201", Line 1, delete "Processor" and insert -- Pr g Circuitry --, therefor.

In Fig. 23, Sheet 22 of 30, for Tag "1390-2", Lines 1-2, delete "Non transitory storage" and insert -- Non-transitory storage media --, therefor at both occurrences.

In the Specification

In Column 1, Line 7, delete "2018," and insert -- 2018, now Pat. No. 10,542,428, --, therefor.

In Column 4, Line 67, delete "procedure" and insert -- procedure. --, therefor.

In Column 8, Line 18, delete "my" and insert -- may --, therefor.

In Column 9, Line 10, delete "regardless how" and insert -- regardless of how --, therefor.

In Column 15, Line 18, delete "25 a" and insert -- 25 in a --, therefor.

In Column 15, Line 55, delete "from a from a source" and insert -- from a source --, therefor.

In Column 15, Line 63, delete "parameter" and insert -- parameter) --, therefor.

In Column 17, Lines 50-51, delete "mobility management 620 unit" and insert -- mobility management unit 620 --, therefor.

In Column 19, Line 14, delete "parameter" and insert -- parameter) --, therefor.

In Column 22, Line 48, delete "NodeB's." and insert -- NodeBs. --, therefor.

In Column 22, Line 49, delete "considered a" and insert -- considered as a --, therefor.

In Column 23, Line 22, delete "(SOC)." and insert -- (SoC). --, therefor.

CERTIFICATE OF CORRECTION (continued)
U.S. Pat. No. 11,388,592 B2

In Column 23, Line 32, delete "units" and insert -- units. --, therefor.

In Column 24, Line 36, delete "considered a" and insert -- considered as a --, therefor.

In Column 24, Lines 45-46, delete "radio front end circuitry 1190" and insert -- radio front end circuitry 1192 --, therefor.

In Column 26, Line 44, delete "considered an" and insert -- considered as an --, therefor.

In Column 26, Line 57, delete "considered a" and insert -- considered as a --, therefor.

In Column 27, Line 24, delete "SOC." and insert -- SoC. --, therefor.

In Column 28, Line 39, delete "proximity or" and insert -- proximity sensor or --, therefor.

In Column 29, Line 34, delete "interchangeable." and insert -- interchangeably. --, therefor.

In Columns 29 & 30, Lines 54-67 & 1-3, delete "In FIG.22, . . . . . etc.".

In Column 31, Line 17, delete "data file 1227." and insert -- data 1227. --, therefor.

In Column 31, Lines 24-25, delete "high-density digital versatile disc (HD-DVD)" and insert -- high definition digital versatile disc (HD-DVD) --, therefor.

In Column 31, Line 31, delete "identity (SIM/RUIM) module," and insert -- identity module (SIM/RUIM), --, therefor.

In Column 32, Lines 64, delete "memory 1390. Memory 1390" and insert -- memory 1390-1. Memory 1390-1 --, therefor.

In Column 35, Line 11, delete "embodiments In" and insert -- embodiments. In --, therefor.

In Column 37, Line 56, delete "substep 1830" and insert -- step 1830 --, therefor.

In Column 38, Line 29, delete "according one" and insert -- according to one --, therefor.

In the Claims

In Column 39, Lines 56-57, in Claim 11, delete "non-access strum key" and insert -- non-access stratum key --, therefor.

In Column 39, Line 57, in Claim 11, delete "(Kcn)." and insert -- (KCN). --, therefor.

In Column 40, Line 46, in Claim 20, delete "The core network node of embodiment" and insert -- The core network node of claim --, therefor.

In Column 40, Line 62, in Claim 23, delete "(Kcn)." and insert -- (KCN). --, therefor.